United States Patent
Saito

(10) Patent No.: US 10,681,278 B2
(45) Date of Patent: Jun. 9, 2020

(54) IMAGE CAPTURING APPARATUS, CONTROL METHOD OF CONTROLLING THE SAME, AND STORAGE MEDIUM FOR DETERMINING RELIABILITY OF FOCUS BASED ON VIGNETTING RESULTING FROM BLUR

(71) Applicant: CANON KABUSHIKI KAISHA, Tokyo (JP)

(72) Inventor: Junichi Saito, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 24 days.

(21) Appl. No.: 16/188,815

(22) Filed: Nov. 13, 2018

(65) Prior Publication Data

US 2019/0158744 A1    May 23, 2019

(30) Foreign Application Priority Data

Nov. 17, 2017 (JP) ................................ 2017-221995

(51) Int. Cl.
*H04N 5/232* (2006.01)
*H04N 19/50* (2014.01)
(Continued)

(52) U.S. Cl.
CPC ....... *H04N 5/23264* (2013.01); *G06K 9/3241* (2013.01); *H04N 5/217* (2013.01);
(Continued)

(58) Field of Classification Search
CPC ............... H04N 5/23264; H04N 19/50; H04N 5/232122; H04N 5/217; H04N 5/23212;
(Continued)

(56) References Cited

U.S. PATENT DOCUMENTS

| | | | | |
|---|---|---|---|---|
| 2009/0295964 A1* | 12/2009 | Utagawa | .............. | H04N 5/2254 348/302 |
| 2012/0268613 A1* | 10/2012 | Nishio | .................. | G02B 7/346 348/208.5 |
| 2015/0207984 A1* | 7/2015 | Hamano | ............ | H04N 5/23212 348/349 |

FOREIGN PATENT DOCUMENTS

| | | |
|---|---|---|
| JP | 4567313 B | 10/2010 |
| JP | 2016-057474 A | 4/2016 |
| JP | 5900257 B | 4/2016 |

* cited by examiner

*Primary Examiner* — Nicholas G Giles
(74) *Attorney, Agent, or Firm* — Cowan, Liebowitz & Latman, P.C.

(57) ABSTRACT

An image capturing apparatus includes: a focus detection unit configured to perform focus detection based on a phase difference between a plurality of image signals obtained by photo-electrically converting light beams that respectively pass through different partial pupil regions of an imaging optical system; an image blur correction unit configured to correct image blur of an object image by driving an optical member for image blur correction; and a determination unit configured to determine reliability of a focus detection result detected by the focus detection unit based on information regarding a focus detection area with respect to which the focus detection unit performs focus detection, and information regarding vignetting that occurs in light beams that pass through the imaging optical system as a result of the image blur correction unit correcting the image blur.

15 Claims, 12 Drawing Sheets

(51) Int. Cl.
  *G06K 9/32*    (2006.01)
  *H04N 5/217*   (2011.01)
(52) U.S. Cl.
  CPC ..... *H04N 5/23212* (2013.01); *H04N 5/23287* (2013.01); *H04N 5/232122* (2018.08); *H04N 19/50* (2014.11)
(58) Field of Classification Search
  CPC . H04N 5/23287; H04N 5/3572; G06K 9/3241
  See application file for complete search history.

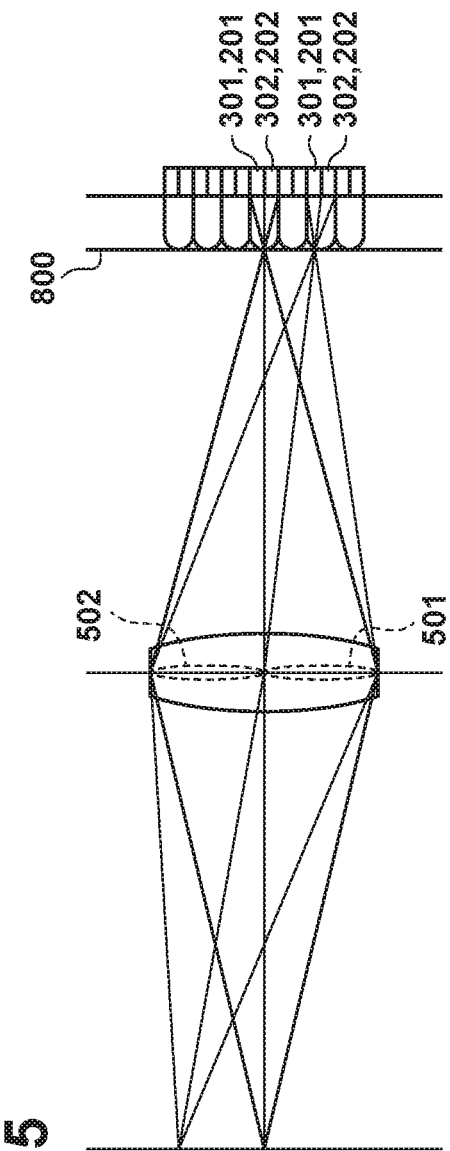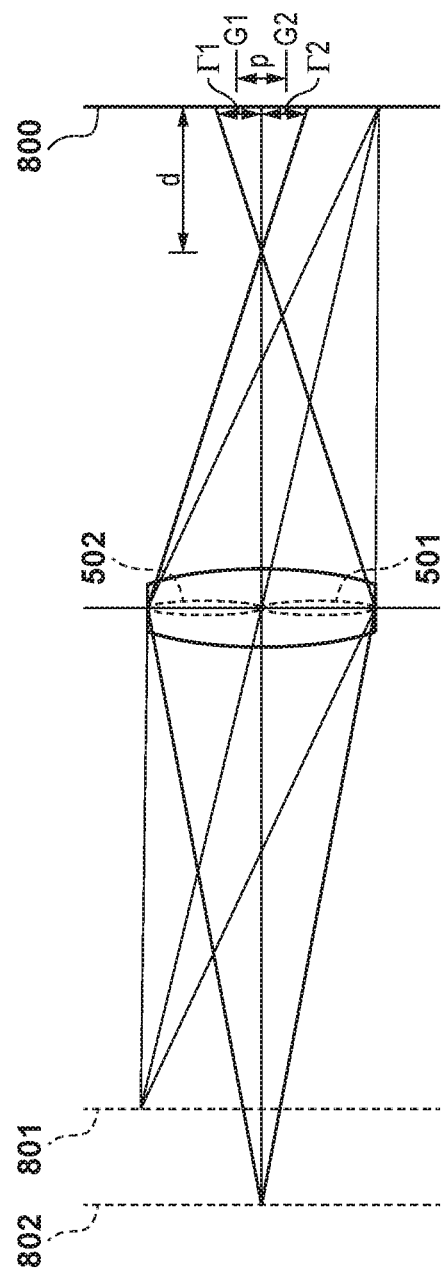

IMAGE CAPTURING APPARATUS, CONTROL METHOD OF CONTROLLING THE SAME, AND STORAGE MEDIUM FOR DETERMINING RELIABILITY OF FOCUS BASED ON VIGNETTING RESULTING FROM BLUR

BACKGROUND OF THE INVENTION

Field of the Invention

The present invention relates to an image capturing apparatus that has a focus detection function that employs an image sensor and an image blur correction function.

Description of the Related Art

Most digital cameras these days include automatic focusing functions that use a phase difference detection method and a contrast detection method. A technique in which focus detection using a phase difference detection method is performed using a signal from an image sensor for shooting is disclosed, as one of the automatic focusing functions, in Japanese Patent Laid-Open No. 2016-57474. A technique in which focus detection pixels for performing focus detection are arranged in an imaging plane of an image sensor, and focus detection is performed based on the phase difference between two image capture signals that are obtained from different regions of the exit pupil of the imaging optical system is disclosed in Japanese Patent Laid-Open No. 2016-57474.

Also, digital cameras that have an image blur correction function of correcting image blur caused by camera shake or the like have increased in recent years. A technique in which image blur correction is performed by driving an image sensor or a portion of the imaging optical system is disclosed in Japanese Patent No. 4567313.

As a result of image blur correction being performed, as in Japanese Patent No. 4567313, when focus detection is performed using an image sensor for shooting, as in Japanese Patent Laid-Open No. 2016-57474, an object that a photographer desires to bring into focus can be kept at a desired position in a shooting screen, that is, inside a focus detection frame. Therefore, framing performed by a photographer can be accurately assisted.

On the other hand, as is disclosed in Japanese Patent No. 4567313, driving an image sensor or a portion of the imaging optical system for image blur correction corresponds to virtually changing a positional relationship between the optical axis of the imaging optical system and the center of the image sensor, and is equivalent to changing the image height of a focus detection frame. In focus detection using an image sensor, as is disclosed in Japanese Patent Laid-Open No. 2016-57474, a change in the image height influences the reliability of the focus detection result. With regard to these issues, a technique of determining the reliability of phase difference information (focus detection result) according to the amount of image blur correction is disclosed in Japanese Patent No. 5900257.

However, determining the reliability of phase difference information according to the amount of image blur correction, as is disclosed in Japanese Patent No. 5900257, has the following issues. That is, even if the amount of image blur correction is large, there are cases where, depending on the position of the focus detection frame, the degree of influence, on the focus detection, of vignetting of a light beam caused by a holding frame that holds the imaging optical system or the like is small. That is, it is possible that determining the reliability of phase difference information according to simply the amount of image blur correction incurs a case where the reliability of phase difference information is determined as being excessively low.

SUMMARY OF THE INVENTION

The present invention has been made in view of the above-mentioned problems, and provides an image capturing apparatus including an image blur correction function that can appropriately determine the reliability of a focus detection result.

According to a first aspect of the present invention, there is provided an image capturing apparatus comprising: a focus detection unit configured to perform focus detection based on a phase difference between a plurality of image signals obtained by photo-electrically converting light beams that respectively pass through different partial pupil regions of an imaging optical system; an image blur correction unit configured to correct image blur of an object image by driving an optical member for image blur correction; and a determination unit configured to determine reliability of a focus detection result detected by the focus detection unit based on information regarding a focus detection area on which the focus detection unit performs focus detection, and information regarding vignetting that occurs in light beams that pass through the imaging optical system as a result of the image blur correction unit correcting the image blur.

According to a second aspect of the present invention, there is provided a method of controlling an image capturing apparatus including a focus detection unit configured to perform focus detection based on a phase difference between a plurality of image signals obtained by photo-electrically converting light beams that have respectively pass through different partial pupil regions of an imaging optical system, and an image blur correction unit configured to correct image blur of an object image by driving an optical member for image blur correction, the method comprising: determining reliability of a focus detection result detected by the focus detection unit based on information regarding drive history of the image blur correction unit, information regarding a focus detection area on which the focus detection unit performs focus detection, and information regarding vignetting that occurs in light beams that pass through the imaging optical system, in a period during which the focus detection unit performs focus detection.

According to a third aspect of the present invention, there is provided an image capturing apparatus comprising: at least one processor or circuit configured to perform the operations of the following units: a focus detection unit configured to perform focus detection based on a phase difference between a plurality of image signals obtained by photo-electrically converting light beams that have respectively passed through different partial pupil regions of an imaging optical system; an image blur correction unit configured to correct image blur of an object image by driving an optical member for image blur correction; and a determination unit configured to determine reliability of a focus detection result detected by the focus detection unit based on information of a focus detection area on which the focus detection unit performs focus detection, and information regarding vignetting that occurs in light beams that pass through the imaging optical system as a result of the image blur correction unit correcting the image blur.

Further features of the present invention will become apparent from the following description of exemplary embodiments with reference to the attached drawings.

BRIEF DESCRIPTION OF THE DRAWINGS

FIG. 5 is a diagram schematically illustrating the image sensor and the pupil division.

FIG. 6 is a diagram illustrating a relationship between a defocus amount and an image shift amount between a first focus detection signal and a second focus detection signal.

DESCRIPTION OF THE EMBODIMENTS

Figure 1:
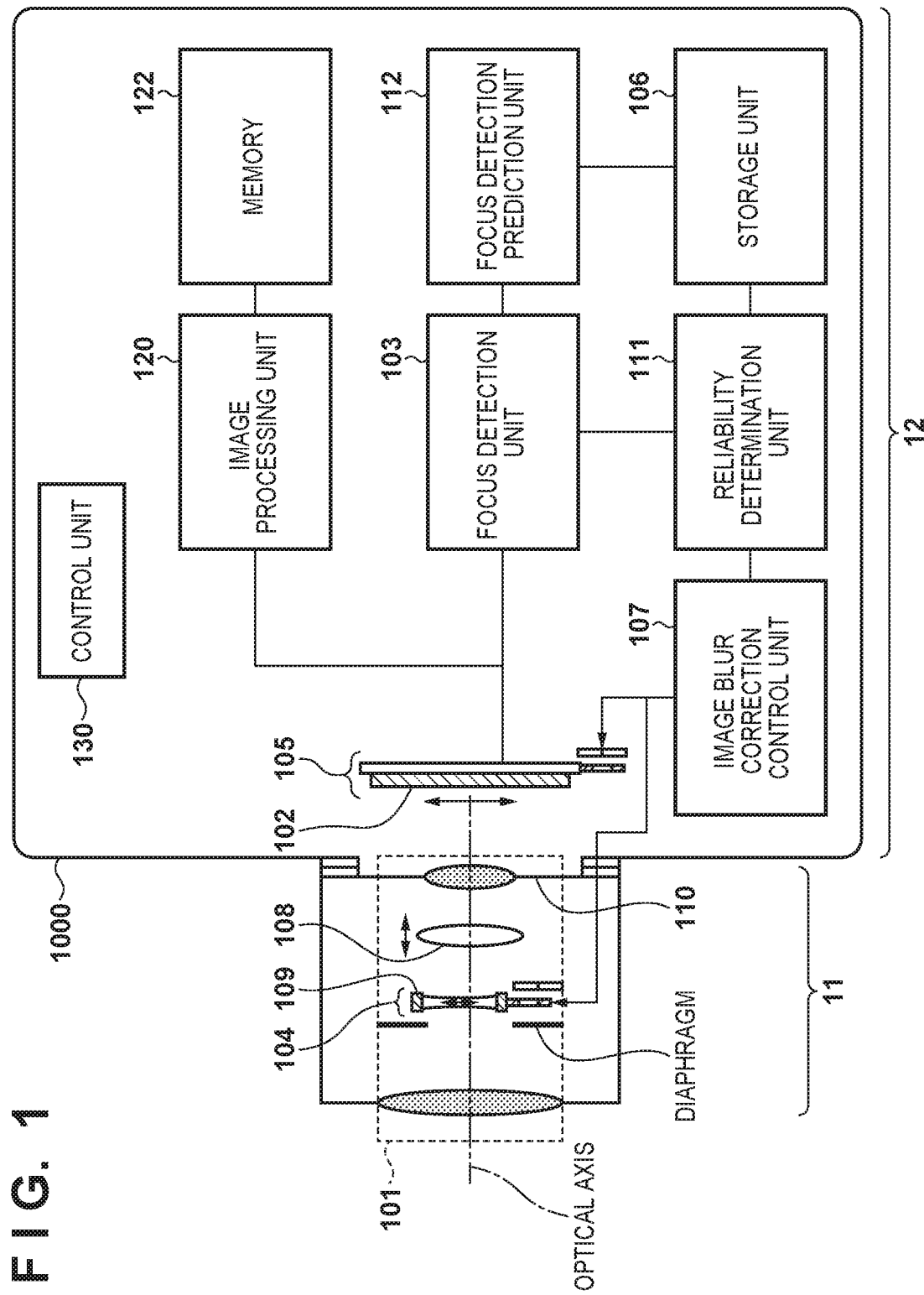
FIG. 1 is a block diagram illustrating a configuration of an image capturing apparatus according to one embodiment of the present invention.

Hereinafter, one embodiment of the present invention will be described in detail with reference to the attached drawings. FIG. 1 is a block diagram illustrating a schematic configuration of an image capturing apparatus 1000 according to one embodiment of the present invention.

In FIG. 1, the image capturing apparatus 1000 is an interchangeable lens digital camera. In the image capturing apparatus 1000, an imaging optical system 101 is arranged inside an attached interchangeable lens 11, and an optical path for a shooting light beam is formed. A light beam that has passed through the optical path reaches an image sensor 102 arranged inside a camera body 12, and an object image is formed thereon. The image sensor 102 includes a plurality of pixels in a plane that is perpendicular to an optical axis, and a formed object image is photo-electrically converted by photodiodes in the pixels.

An image processing unit 120 performs gamma processing, noise processing, and the like on the image signals obtained by photo-electric conversion, and the resultant signals are written into a nonvolatile memory 122 as image data. Accordingly, the shooting processing for one image is performed. It is necessary that the image capturing apparatus 1000 performs focus detection when instructed by a photographer, and can shoot an image in which a desired object has come into focus. Here, pixels arranged in the image sensor 102 also function as focus detection pixels, and a focus detection unit 103 detects the focus state of the object based on outputs of the focus detection pixels.

Upon receiving a detection result from the focus detection unit 103, a reliability determination unit 111 determines the reliability of the focus detection result. Furthermore, the focus detection unit 103 calculates the drive amount of a focus lens 108 that is to be moved in an optical axis direction to bring the object into focus, and a control unit 130 drives the focus lens 108 in the optical axis direction by this drive amount. Note that the focus detection will be described in detail later.

Also, the image capturing apparatus 1000 includes two types of correction units for correcting image blur that occurs due to an unnecessary vibration such as a shake of the hand of the photographer at shooting. One of them is a first image blur correction unit 104 that corrects image blur by driving an image blur correction lens 109, which is arranged inside the interchangeable lens 11 and constitutes a portion of the imaging optical system 101, in a plane perpendicular to the optical axis. The image blur correction lens 109 (optical member for image blur correction) is constituted by one concave lens that is arranged on the image plane side relative to a diaphragm, for example.

Note that, here, the image blur correction is performed by shifting a lens, but the present invention is not limited to this method. For example, the image blur correction may be performed by swinging the entirety of the imaging optical system 101, or the image blur correction may be performed by arranging a variable prism at a portion of the imaging optical system 101 and changing the angle of the prism.

The other image blur correction unit is a second image blur correction unit 105 that performs image blur correction by shift-driving the image sensor 102 (optical member for image blur correction) in a plane perpendicular to the optical axis. As a result of using the first and second image blur correction units 104 and 105, the region in which image blur correction can be applied can be enlarged, and a shot image can be stabilized.

A holding frame 110 in the interchangeable lens 11 is a lens-barrel mechanical structure portion that holds the final group of the imaging optical system 101. So-called "vignetting" occurs in which the shooting light beam is blocked by such a mechanical structure, which is not limited to the holding frame 110, in a high image height region at a distance from the optical axis of the image sensor. It is known that this "vignetting" influences the focus detection. The "vignetting" will be described later.

The image capturing apparatus 1000 includes a live view continuous shooting function. In a shooting preparation state, image data (so-called live view image) that is read out from the image sensor 102 and is generated by the image processing unit 120 is displayed in an unshown backside liquid crystal panel. When an unshown release button is pressed half-way (switch SW1 is turned on), a focus detection operation is started with respect to a focus detection area that has been set, in a live view image, by the image capturing apparatus 1000 or the photographer. In a period during which the switch SW1 is on as well, live view images are successively generated, and some of or all of the frames are displayed in the backside liquid crystal panel, and the focus detection operation is executed with respect to the focus detection area. Thereafter, when the release button is pressed fully (switch SW2 is turned on), the focus detection operation is completed, an unshown shutter operates, and actual exposure is performed by the image sensor 102 at a set shutter speed. The period during which this actual exposure is performed is called an actual exposure period, and the period that is not the actual exposure period is called a non-actual exposure period. When the state in which the switch SW2 is on continues, continuous shooting is started, actual exposure and non-actual exposure are repeatedly executed until the switch SW2 is turned off.

The focus detection unit 103 performs focus detection on both image data (so-called live view image) obtained in the non-actual exposure period and an actual exposure image obtained in the actual exposure period. The first and second image blur correction units 104 and 105 limit the drive amount for image blur correction in a period in which the switch SW1 is on and in the non-actual exposure period relative to that in the actual exposure period, in order to prevent the focus detection accuracy from decreasing due to "vignetting" described above.

The image capturing apparatus 1000 includes a focus detection prediction unit 112. The focus detection prediction unit 112 predicts the focus detection result for the next frame and thereafter using the history of focus detection results of the focus detection unit 103, which is stored in the storage unit 106, as a learning target. Specifically, the focus detection prediction unit 112 linearly extrapolates the relationship between the distance between the main object being shot and the image capturing apparatus 1000 from the history of detection results of the focus detection unit 103, and specifies the position at which the focus lens 108 should be present at the next instance of shooting. In this focus detection prediction, processing in which focus detection results whose reliability is low are removed from the learning target and the like is performed considering the above-described reliability determination result, which will be described in detail later.

Imaging Plane Phase Difference Focus Detection System

Figure 2:
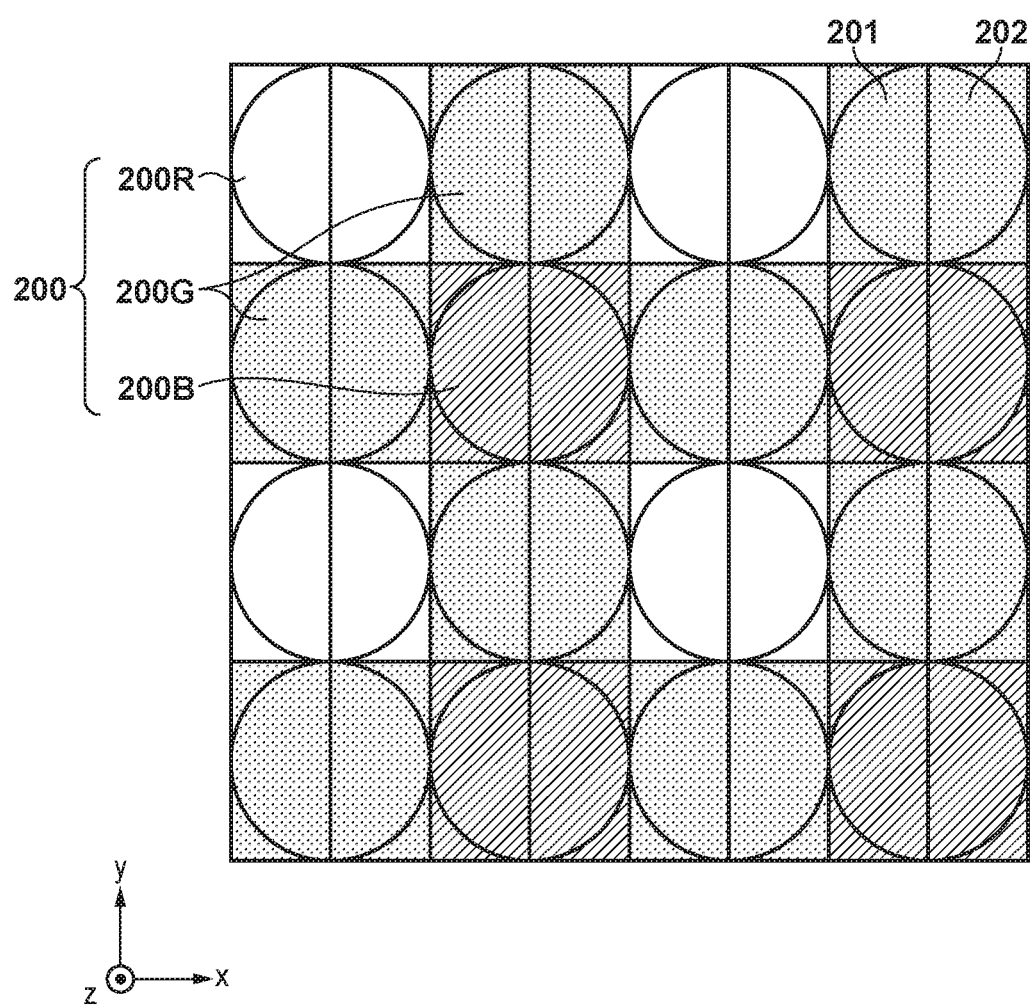
FIG. 2 is a schematic diagram of pixel arrangement of an image sensor.

Next, the focus detection to be performed by the image capturing apparatus 1000 of the present embodiment will be described. FIG. 2 is a diagram illustrating the pixel arrangement of the image sensor 102 of the image capturing apparatus 1000 in a range of 4 columns×4 rows, and the focus detection pixel arrangement in a range of 8 columns×4 rows.

In the pixel group 200 of 2 columns×2 rows shown in FIG. 2, a pixel 200R with spectral sensitivity to R (red) is arranged at an upper left position, a pixel 200G with spectral sensitivity to G (green) is arranged at upper right and lower left positions, and a pixel 200B with spectral sensitivity to B (blue) is arranged at a lower right position. Furthermore, each pixel is constituted by a first focus detection pixel 201 and a second focus detection pixel 202 that are arranged in 2 columns×1 row.

A plurality of arrays of pixels in 4 columns×4 rows (focus detection pixels in 8 columns×4 rows) shown in FIG. 2 are arranged on an imaging plane, and as a result, a captured image (focus detection signal) can be acquired. In the present embodiment, a description will be given using an image sensor in which the period P of the pixels is 4 μm, the number of pixels N is 20.75 million pixels, the pixel array being constituted by 5575 columns, in a horizontal direction, and 3725 rows, in a vertical direction, the period of the focus detection pixels in the column direction PAF is 2 μm, and the number of focus detection pixels NAF is about 41.50 million pixels, the focus detection pixel array being constituted by 11150 columns, in the horizontal direction, and 3725 rows, in the vertical direction.

Figure 3A:
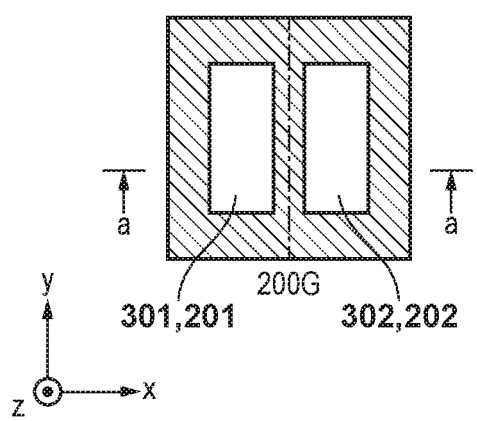
FIGS. 3A and 3B are a schematic plan view and a schematic cross-sectional view of a pixel.
Figure 3B:
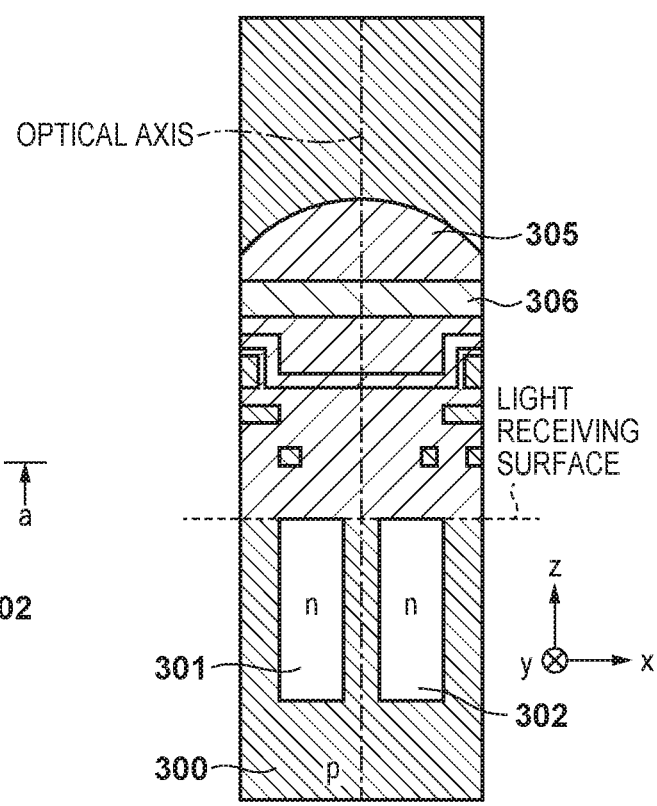

A plan view of one of the pixels 200G of the image sensor 102 shown in FIG. 2 viewed from a light receiving surface side (+z side) of the image sensor 102 is shown in FIG. 3A, and a cross-sectional view thereof taken along line a-a in FIG. 3A viewed from a −y side is shown in FIG. 3B. Note that the "optical axis" illustrated in FIG. 3B indicates an optical axis of a micro lens 305.

As shown in FIGS. 3A and 3B, in the pixel 200G, a microlens 305 for condensing incident light is formed on the light receiving side of each pixel. The pixel is divided by NH (here, divided by two) in the x direction and divided by NV (here, divided by one, or not divided) in the y direction to form photoelectric conversion portions 301 and 302. The photoelectric conversion portions 301 and 302 respectively correspond to the first and second focus detection pixels 201 and 202. Each of the photoelectric conversion portions 301 and 302 may be formed as a pin structure photodiode including an intrinsic layer interposed between a p-type layer and an n-type layer or a p-n junction photodiode without an intrinsic layer, as needed.

In each pixel, a color filter 306 is formed between the microlens 305 and the photoelectric conversion portions 301 and 302. The spectral transmittance of the color filter may be changed for each sub-pixel, as needed, or the color filter may be omitted. Light that has entered the pixel 200G shown in FIGS. 3A and 3B is condensed by the microlens 305, spectrally split by the color filter 306, and received by the photoelectric conversion portions 301 and 302.

In the photoelectric conversion portions 301 and 302, electron-hole pairs are produced in accordance with the received light amount and separated in the depletion layer. Electrons having negative charges are accumulated in the n-type layers. On the other hand, holes are discharged externally from the image sensor through the p-type layers connected to a constant voltage source (not shown). The electrons accumulated in the n-type layers of the photoelectric conversion portions 301 and 302 are transferred to electrostatic capacitances (FDs) through transfer gates, and converted into voltage signals.

Figure 4:
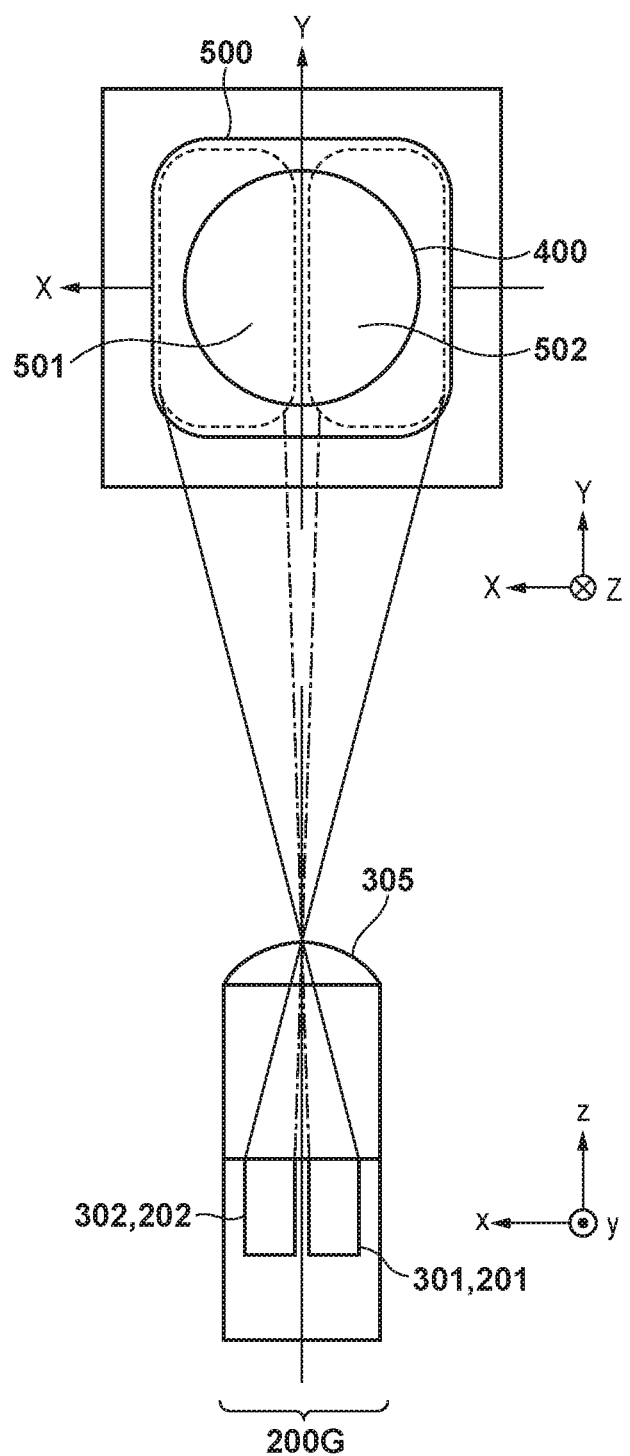
FIG. 4 is a diagram schematically illustrating a pixel and a pupil division.

The correspondence between pupil division and the pixel structure shown in FIGS. 3A and 3B is schematically illustrated in FIG. 4. FIG. 4 illustrates a cross-sectional view of the pixel structure shown in FIG. 3A taken along line a-a viewed from the +y side and the exit pupil plane of an imaging optical system 101. In FIG. 4, to obtain correspondence with the coordinate axes of the exit pupil plane, the x- and y-axes of the cross-sectional view are reversed with respect to those of FIGS. 3A and 3B.

In FIG. 4, a first partial pupil region 501 corresponding to the first focus detection pixel 201 represents a pupil region that is almost conjugate with the light receiving surface of the photoelectric conversion portion 301 having a center of gravity decentered in the −x direction via the microlens 305, and light beams that have passed through the first partial pupil region 501 are received by the first focus detection pixel 201. The first partial pupil region 501 corresponding to the first focus detection pixel 201 has a center of gravity decentered to the +X side on the pupil plane.

In FIG. 4, a second partial pupil region 502 corresponding to the second focus detection pixel 202 represents a pupil region that is almost conjugate with the light receiving surface of the photoelectric conversion portion 302 having a center of gravity decentered in the +x direction via the microlens 305, and light beams that have passed through the second partial pupil region 502 are received by the second focus detection pixel 202. The second partial pupil region 502 corresponding to the second focus detection pixel 202 has a center of gravity decentered to the −X side on the pupil plane. An exit pupil 400 is formed by a diaphragm opening of the imaging optical system 101, and light beams inside this region reach the image sensor 102. Also, in FIG. 4, light beams that have passed through a pupil region 500 are received by the whole pixel 200G including the photoelectric conversion portions 301 and 302 (first focus detection pixel 201 and the second focus detection pixel 202).

The schematic correspondence between the image sensor 102 and pupil division is shown in FIG. 5. Light beams that have passed through different partial pupil regions, namely, the first partial pupil region 501 and the second partial pupil region 502 enter the pixels of the image sensor 102 at different incidence angles and are received by the first and second focus detection pixels 201 and 202 divided into 2×1 parts. In this embodiment, the pupil region is divided into two parts in the horizontal direction. However, the pupil may be divided in the vertical direction, as needed.

In other words, a plurality of first focus detection pixels 201 that each receive light beams that pass through the first partial pupil region 501 of the imaging optical system 101 and a plurality of second focus detection pixels 202 that each receive light beams that pass through the second partial pupil region 502, of the imaging optical system 101, that is different from the first partial pupil region 501 are arranged in the image sensor 102. Also, a plurality of image capturing pixels that each receive light beams that pass through a pupil area formed by combining the first partial pupil region 501 and the second partial pupil region 502 of the imaging optical system 101 are formed in the image sensor 102. In the image sensor 102 of the present embodiment, each image capturing pixel is constituted by a first focus detection pixel and a second focus detection pixel.

In the present embodiment, a light reception signal of the first focus detection pixel 201 in each pixel of the image sensor 102 is collected to generate a first focus detection signal. A light reception signal of the second focus detection pixel 202 in each pixel is collected to generate a second focus detection signal, and focus detection is performed. An imaging signal having a resolution of the effective pixel number N is generated by adding signals obtained from the first focus detection pixel 201 and the second focus detection pixel 202 in every pixel of the image sensor 102.

Hereinafter, a description will be given of a relationship between a defocus amount and an image shift amount of the first focus detection signal and the second focus detection signal acquired by the image sensor 102.

FIG. 6 is a diagram illustrating a schematic relationship between a defocus amount and an image shift amount between the first focus detection signal and the second focus detection signal. The image sensor 102 is arranged on an imaging plane 800, and the exit pupil of the imaging optical system 101 is divided into two parts, namely the first partial pupil region 501 and the second partial pupil region 502, similarly to FIGS. 4 and 5.

The defocus amount d is defined to have a magnitude $|d|$ of the distance between the image forming position of the object and the imaging plane. Also, a negative sign (d<0) is given when in a front-focused state in which the image forming position of the object is on the object side relative to the imaging plane, and a positive sign (d>0) is given when in a rear-focused state in which the image forming position of the object is on the side opposite to the object relative to the imaging plane. When in an in-focus state in which the image forming position of the object is on the imaging plane (in-focus position), d=0. In FIG. 6, an object 801 is an example of the in-focus state (d=0), and an object 802 is an example of the front-focused state (d<0). The front-focused state (d<0) and the rear-focused state (d>0) will be collectively referred to as a defocused state ($|d|>0$).

In the front-focused state (d<0), of the light beams from the object 802, the light beams that have passed through the first partial pupil region 501 are once condensed, and thereafter expanded to a width Γ1 centered on a center of gravity position G1 of the light beams, and form a blurred image on the imaging plane 800. The blurred image is received by the first focus detection pixels 201 that constitute pixels arranged in the image sensor 102, and a first focus detection signal is generated. Accordingly, the first focus detection signal is recorded as an image in which the object 802 is blurred so as to have the width Γ1 centered on the center of gravity position G1 on the imaging plane 800.

Similarly, of the light beams from the object 802, the light beams that have passed through the second partial pupil region 502 are once condensed, and hereafter expanded to a width Γ2 centered on a center of gravity position G2 of the light beams, and form a blurred image on the imaging plane 800. The blurred image is received by the second focus detection pixels 202 that constitute pixels arranged in the image sensor 102, and a second focus detection signal is generated. Accordingly, the second focus detection signal is recorded as an image in which the object 802 is blurred so as to have the width Γ2 centered on the center of gravity position G2 on the imaging plane 800.

The blur widths Γ1 and Γ2 of the object images increase roughly in proportion to an increase in the magnitude $|d|$ of the defocus amount d. Similarly, the magnitude $|p|$ of an image shift amount p (=difference G1−G2 between the center of gravity positions of the light beams) of the object image between the first focus detection signal and the second focus detection signal increases roughly in proportion to an increase in the magnitude $|d|$ of the defocus amount d. The same applies to the rear-focused state (d>0), whereas the direction of the image shift in the object images between the first focus detection signal and the second focus detection signal is opposite to that in the front-focused state.

Therefore, the magnitude of the image shift amount between the first focus detection signal and the second focus detection signal increases with an increase in the magnitude of the defocus amount of the first focus detection signal and the second focus detection signal, or the magnitude of the defocus amount of the imaging signal obtained by adding the first focus detection signal and the second focus detection signal. In the present embodiment, focus detection using a phase difference method is performed using the relationship between the defocus amount and the image shift amount between the first focus detection signal and the second focus detection signal.

Hereinafter, the focus detection using the phase difference method will be described. In the focus detection using the phase difference method, the first focus detection signal and the second focus detection signal are relatively shifted, the amount of correlation that indicates the degree of coincidence of the signals is calculated, and the image shift amount is detected from a shift amount with which the correlation is improved. Based on the relationship in which the magnitude of the image shift amount between the first focus detection signal and the second focus detection signal increases with an increase in the magnitude of the defocus amount of the imaging signal, the image shift amount is converted into a detected defocus amount to perform focus detection.

Figure 7:
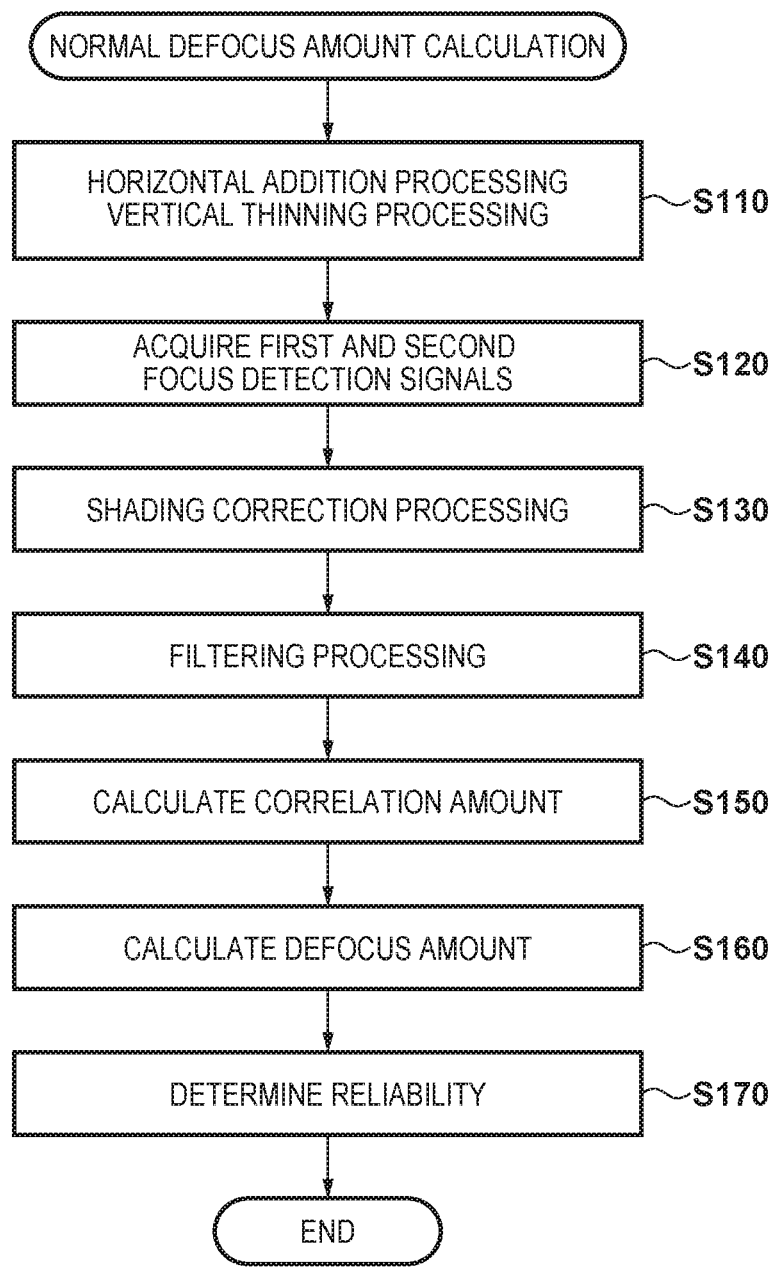
FIG. 7 is a flowchart illustrating a schematic flow of focus detection processing.

FIG. 7 is a flowchart illustrating a flow of the focus detection processing in the present embodiment. Note that the operations in FIG. 7 are executed by the focus detection unit 103.

In step S110, three-pixel addition processing in the horizontal direction is performed on each of the first focus detection signal and the second focus detection signal that are read out from the image sensor 102, in order to reduce the signal data amount, and Bayer (RGB) addition processing is also performed in order to convert RGB signals into luminance Y signals. Also, vertical thinning processing is performed in which data on one row is read out every three rows. Note that, in the present embodiment, the horizontal addition processing and the vertical thinning processing are performed on signals read out from the image sensor 102, but there is no limitation thereto, and the horizontal addition processing and the vertical thinning processing may be performed in the image sensor 102 in advance.

In step S120, a focus detection area is set, from the effective pixel region of the image sensor 102, on which focus adjustment is performed. The first focus detection signal is generated from a light reception signal of the first focus detection pixels in the focus detection area, and the second focus detection signal is generated from a light reception signal of the second focus detection pixels in the focus detection area.

In step S130, shading correction processing is performed on the first focus detection signal and the second focus detection signal.

Figure 8:
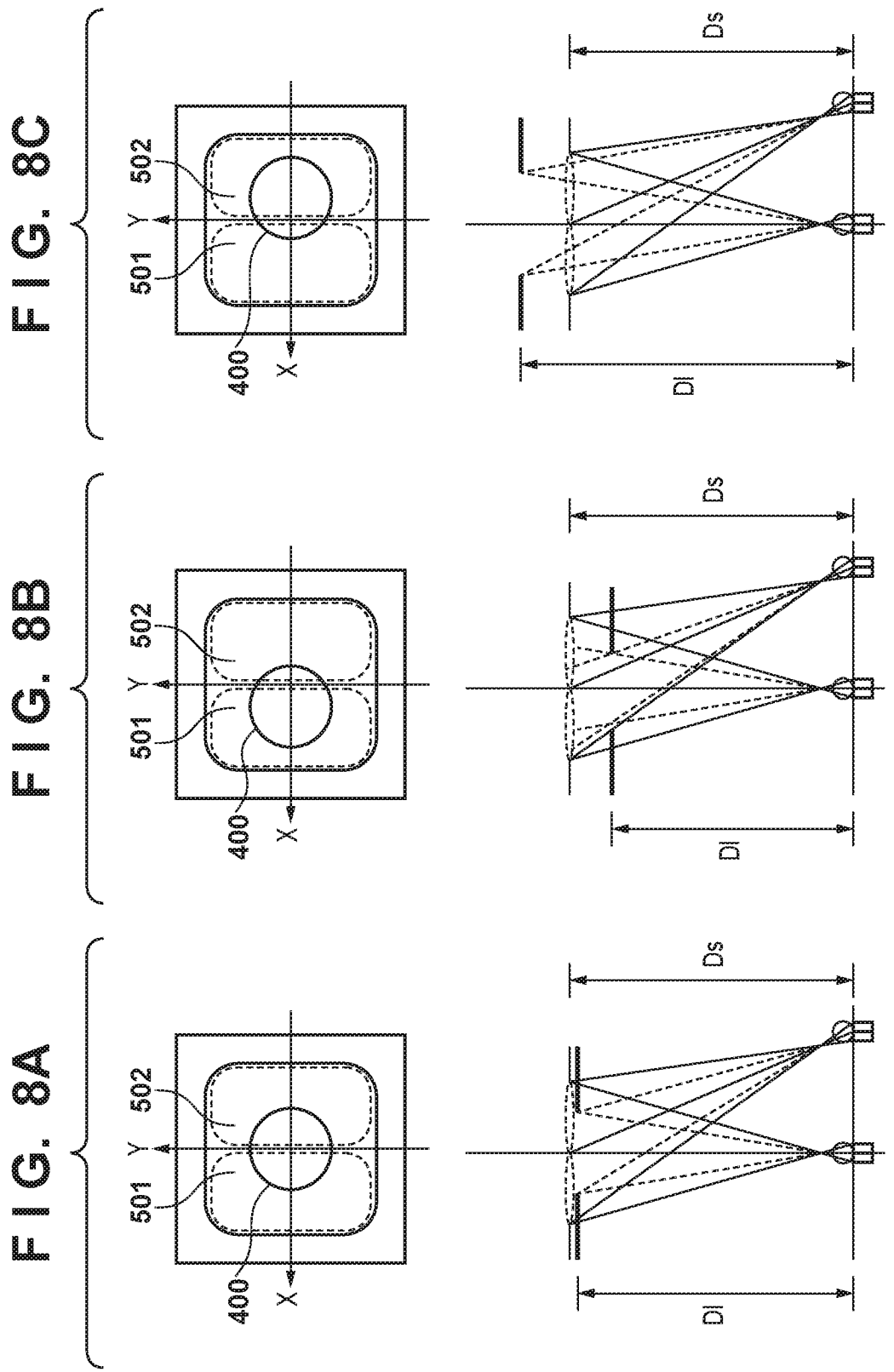
FIGS. 8A to 8C are diagrams schematically illustrating shading caused by a shift of a pupil in the first focus detection signal and the second focus detection signal.

Hereinafter, the shading caused by a shift of a pupil between the first focus detection signal and the second focus detection signal will be described. FIGS. 8A to 8C are diagrams illustrating relationships between the first partial pupil region 501 corresponding to the first focus detection pixel 201, the second partial pupil region 502 corresponding to the second focus detection pixel 202, and the exit pupil 400 of the imaging optical system 101, at a peripheral image height of the image sensor 102.

FIG. 8A is a diagram illustrating a case where the exit pupil distance Dl of the imaging optical system 101 is the same as the set pupil distance Ds of the image sensor 102. In this case, the exit pupil 400 of the imaging optical system 101 is roughly equally divided by the first partial pupil region 501 and the second partial pupil region 502.

In contrast, in the case where the exit pupil distance Dl of the imaging optical system 101 is shorter than the set pupil distance Ds of the image sensor 102 as shown in FIG. 8B, a shift occurs between the exit pupil 400 and the entrance pupil of the image sensor 102 at the peripheral image height of the image sensor 102, and the exit pupil 400 is unequally divided. Similarly, in the case where the exit pupil distance Dl of the imaging optical system 101 is longer than the set pupil distance Ds of the image sensor 102 as shown in FIG. 8C, a shift also occurs between the exit pupil 400 and the entrance pupil of the image sensor 102 at the peripheral image height of the image sensor 102, and the exit pupil 400 is unequally divided. As the pupil division becomes unequal at the peripheral image height, the intensities of the first focus detection signal and the second focus detection signal also become unequal, and shading occurs, that is, the intensity of one of the first focus detection signal and the second focus detection signal becomes larger and the intensity of the other one becomes smaller.

In step S130 in FIG. 7, a first shading correction coefficient of the first focus detection signal and a second shading correction coefficient of the second focus detection signal are generated according to the image height of the focus detection area, the F-number (diaphragm value) of the imaging optical system 101, the exit pupil distance, and the vignetting state of the exit pupil light beams. Shading correction processing is performed on the first focus detection signal and the second focus detection signal by multiplying the first focus detection signal by the first shading correction coefficient and multiplying the second focus detection signal by the second shading correction coefficient.

In the focus detection using the phase difference method, the detected defocus amount is detected based on the correlation between the first focus detection signal and the second focus detection signal. If shading occurs due to a shift of a pupil, there are cases where the correlation between the first focus detection signal and the second focus detection signal decreases. Accordingly, in the focus detection using the phase difference method, it is desirable to perform the shading correction processing (optical correction processing) in order to improve the correlation (degree of coincidence of signals) between the first focus detection signal and the second focus detection signal and to obtain good focus detection performance.

Although unshown in FIGS. 8A to 8C, other than the opening constituting the exit pupil 400, mechanical members that hold respective optical systems and mechanical members inside the camera body located at a portion between the final group of the interchangeable lens 11 and the image sensor 102 are present. There are cases where the light beams are shielded by these mechanical members depending on the F-stop and the image height, and this phenomenon is generally referred to as "vignetting" of the light beams. Shading of the first focus detection signal and the second focus detection signal also occurs due to this vignetting, and in conditions in which vignetting is known to occur, the focus detection accuracy can be prevented from decreasing by performing shading correction in which the vignetting is also taken into consideration. In the present embodiment, a shading correction coefficient SHD is stored in the storage unit 106 as a table associated with information regarding the focus detection area (image height), the F-number (diaphragm value), the exit pupil distance, and the vignetting state of the imaging optical system 101. Because the exit pupil distance takes a value that is different for each interchangeable lens (or each zooming state, in the case of zoom lens), tables corresponding to respective exit pupil distances are provided. Also, the vignetting state changes depending on the position of the image blur correction lens 109, and the shading correction coefficient SHD is provided for each stroke amount of the image blur correction lens 109. The vignetting information can be retained, as a result of a table of the shading correction coefficient SHD that is different for each stroke amount of the first image blur correction unit 104 being held.

On the other hand, the shift in the position of the image sensor 102 driven by the second image blur correction unit 105 can be considered as a simple change in the image height of the focus detection area. Therefore, a shading correction coefficient table need not be retained for each position of the image sensor 102, and it is sufficient to retain a relative positional relationship that can be achieved by driving the first image blur correction unit 104 and the second image blur correction unit 105 as the stroke amounts of the image blur correction lens 109. Note that, even in an exposure period for focus detection, since the image blur correction unit is driven, the center of gravity position of the moving locus during the exposure period is used when the shading correction coefficient SHD is selected.

Figure 9:
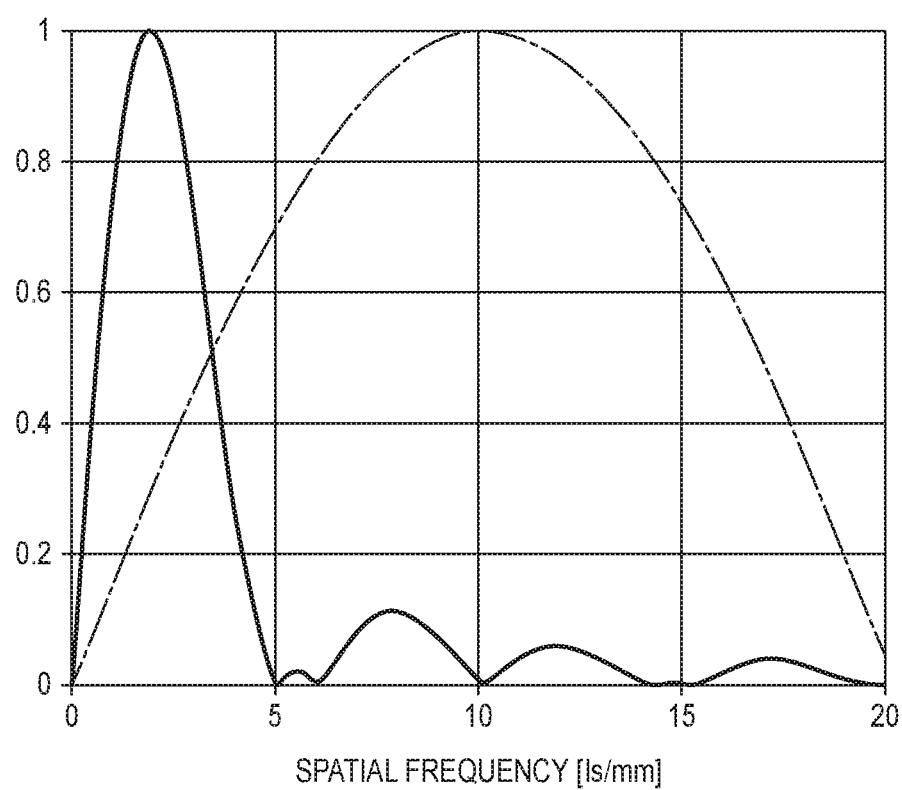
FIG. 9 is a diagram illustrating an exemplary frequency band of a filter.

In step S140 in FIG. 7, filtering processing is performed on the first focus detection signal and the second focus detection signal. An exemplary passband of the filtering processing of the present embodiment is shown by the solid line in FIG. 9. In the present embodiment, because the focus detection in a largely defocused state is performed by the focus detection using the phase difference method, the exemplary passband of the filtering processing is configured to include a low frequency band. When performing focus control in a range from a large defocused state to a slightly defocused state, the passband in the filtering processing at the time of focus detection may be adjusted to a higher frequency band as denoted by the one dot chain line in FIG. 9, in accordance with the defocused state.

Next, in step S150 in FIG. 7, shift processing is performed for relatively shifting, in the pupil division direction, the first focus detection signal and the second focus detection signal that have been subjected to the filtering processing, and the amount of correlation indicating the degree of coincidence of the signals is calculated.

A kth first focus detection signal subjected to the first filtering processing is defined as A(k), a kth second focus detection signal subjected to the first filtering processing is defined as B(k), and the range of the number k corresponding to the focus detection region is defined as W. The shift amount in the shift processing is defined as s1 and the shift range of the shift amount s1 is defined as Γ1, and the amount of correlation COR is calculated using Equation (1).

$$COR(s_1) = \sum_{k \in W} |A(k) - B(k - s_1)|, \, s_1 \in \Gamma 1 \qquad (1)$$

In the first shift processing with the shift amount s1, the kth first focus detection signal A(k) is associated with a k−s1th second focus detection signal B(k−s1), and then the k−s1th second focus detection signal B(k−s1) is subtracted from the kth first focus detection signal A(k) to generate a shift subtraction signal. The absolute value of the generated shift subtraction signal is calculated, the sum thereof with respect to the number k within the range W corresponding to the focus detection region is obtained, and the amount of correlation COR (s1) is calculated. The amounts of correlation calculated for respective rows may be added over multiple rows for each shift amount, as necessary.

In step S160, a shift amount of a real number value with which the amount of correlation takes the smallest value is calculated by performing a sub-pixel operation with respect to the amount of correlation, and is set as an image shift amount p1. The calculated image shift amount p1 is multiplied by the image height of the focus detection region, the F-number of the imaging optical system 101, the exit pupil distance, and a conversion coefficient K1 corresponding to the vignetting information, and the detected defocus amount (Def1) is detected. The conversion coefficient K is retained as table data stored in the storage unit 106 included in the image capturing apparatus 1000. This table is provided to include values corresponding to the exit pupil distance for each interchangeable lens, similarly to the shading correction described above. Also, with respect to the vignetting state as well, the conversion coefficient K is described for each stroke amount of the image blur correction lens 109. In the image capturing apparatus 1000, as a result of having tables of the conversion coefficient K that are different for the respective stroke amounts of this image blur correction lens 109, the vignetting information can be retained. The drive amount of the focus lens 108 is determined by multiplying the detected defocus amount detected by focus sensitivity.

Finally, in step S170, the reliability determination unit 111 determines the reliability of the detected defocus amount that has been detected. This reliability determination is performed by again using the following information that has been taken into consideration in the shading correction processing in step S130. That is, drive history information regarding the first and second image blur correction units 104 and 105, information regarding the focus detection area, and information regarding the vignetting are used. Specifically, the determination is made based on whether or not a large difference is present, with respect to the shading correction coefficient SHD adopted from the table data, between the first shading correction coefficient of the first focus detection signal and the second shading correction coefficient of the second focus detection signal, that have been described above. If the difference is large, which means that one of the focus detection signals is to be multiplied by an extremely large coefficient, that is, the light amount acquired by the pupil division is extremely small, and the possibility of an erroneous focus detection cannot be negated, it is determined that the reliability is low.

Note that the determination is made using a simple difference between two shading correction coefficients, here, but there is no limitation thereto, and it is possible that the reliability is determined to be low, for safety, when a large change in the coefficient is expected in the vicinity of the adopted coefficient or the like. It is also possible that the reliability is determined to be low when the drive amount, in the drive history information regarding the first and second image blur correction units 104 and 105, is extremely large, and it is difficult to select an appropriate shading correction coefficient SHD from only the center of gravity position. Also, here, only the case where reliability is determined based on the influence of vignetting has been described. However, reliability determination using, as indices, the amplitude of object luminance (maximum luminance value-minimum luminance value, intensity ratio), the degree of coincidence between two images that have been subjected to shading correction, and image sharpness, which are conventionally performed, can also be performed.

In the present embodiment, the reliability determination processing gives a reliability determination value in a range from "1" indicating that the reliability is low to "4" indicating that the reliability is high, to the detected defocus amount, for example. Then, the method of using the detected defocus amount obtained in step S160 in focus adjustment driving that is to be performed after the operations in FIG. 7 is changed according to this value. Specifically, when the reliability determination value is low, the detected defocus amount may be used after being multiplied by a coefficient for reduction and the detected defocus amount in this focus detection area may not be used. Here, the reliability determination value having four levels is adopted, but this is merely an example, and a reliability determination value having more levels may be used as a comprehensive reliability determination value considering another reliability determination result.

The operations in FIG. 7 are performed in each frame, when in a still image shooting mode, from when an instruction is made by an unshown shutter button being pressed half-way (switch SW1 is turned on) until when focus detection for confirming in-focus is complete. Also, the operations in FIG. 7 are performed in each frame, when in a moving picture shooting mode. The image height in the focus detection area is determined by making a prediction from the history of tracking (automated selection of the focus detection frame) and the history of drive positions of the two image blur correction units, in a past plurality of frames.

Note that, in the present embodiment, the shading correction coefficient SHD and the conversion coefficient K are stored in the storage unit 106 in the form of a table. However, the present invention is not limited thereto, and the configuration may be such that the vignetting information is retained as a two-dimensional frame shape on a pupil surface, and the coefficients are obtained by performing calculations in the camera based thereon. Also, in the present embodiment, the location of the storage unit 106 is not specified, and the storage unit 106 may be arranged on the camera body 12 side, or may be divided so as to be arranged in the interchangeable lens 11 and the camera body 12.

In the present embodiment, the focus detection processing in FIG. 7 is also applied when a continuous shooting function is executed while performing live view, and the reliability determination is performed on each of the live view image and the actual image, which will be described later.

Next, the relationship between the driving of the first image blur correction unit 104 and the second image blur correction unit 105 and the focus detection, in the present embodiment, will be described using FIGS. 10A to 10F and FIGS. 11A to 11F.

Lens Shift Correction and Pupil Division

Figure 10A:
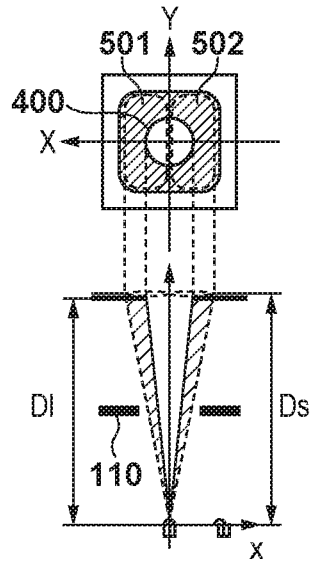
FIGS. 10A to 10F are diagrams schematically illustrating a relationship between driving of a first image blur correction unit and the focus detection.
Figure 10B:
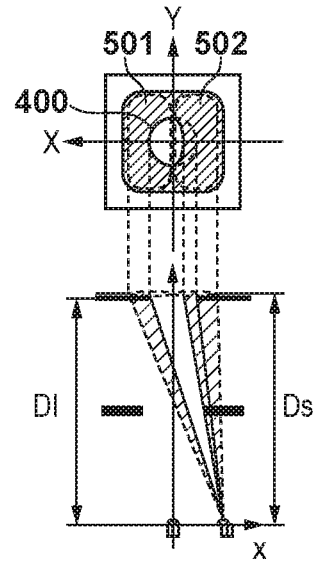
Figure 10C:
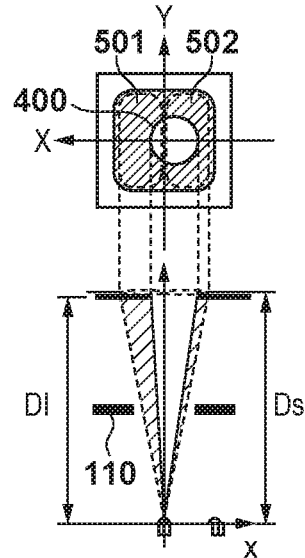
Figure 10D:
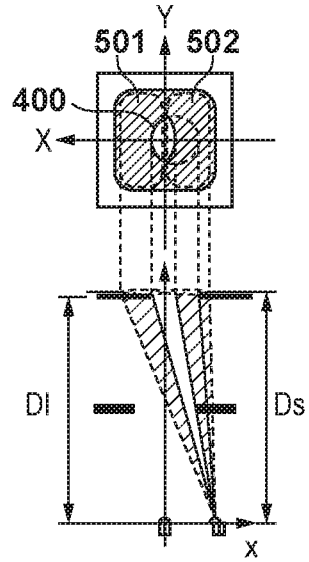
Figure 10E:
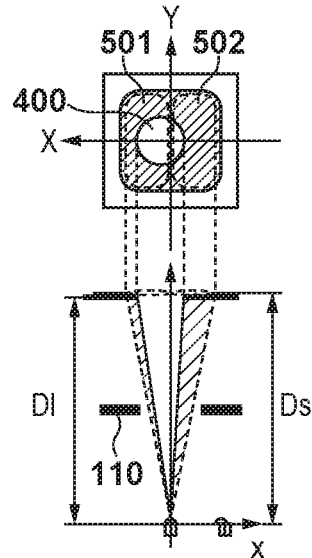

FIGS. 10A, 10B, and 10E are diagrams schematically illustrating a manner of pupil division on the exit pupil plane observed from a pixel group in the focus detection area at the central image height. Also, FIGS. 10B. 10D, and 10F are those observed by a pixel group in the focus detection area at the peripheral image height (+X direction). In FIG. 10, the exit pupil distance Dl of the imaging optical system 101 and the set pupil distance Ds of the image sensor 102 are depicted as almost the same.

A manner of pupil division at the central image height when the image blur correction lens 109 of the first image blur correction unit 104 is positioned at the center of the driving range will be described using FIG. 10A. The circular shape shown at the center of the pupil surface in the upper part of FIG. 10A illustrates the exit pupil 400 formed by the opening of the diaphragm of the imaging optical system 101. It can be understood that, at the central image height, the light beams at the exit pupil plane, of the imaging optical system 101, that is located at a distance almost the same as the set pupil distance of the image sensor 102 are almost equally divided into left and right portions. The thick lines arranged between the exit pupil 400 and the surface of the image sensor 102 schematically illustrate the final group holding frame 110 of the imaging optical system 101, and vignetting caused by this holding frame 110 does not occur at the central image height.

On the other hand, at the peripheral image height in FIG. 10B as well, the set pupil distance Ds of the image sensor 102 is almost the same as the exit pupil distance D1 of the imaging optical system 101, and the light beams at the exit pupil plane of the imaging optical system 101 can be almost equally divided into left and right portions, if the final group holding frame 110 is not present. However, in actuality, vignetting occurs on one side of the light beams due to the final group holding frame 110, and the pupil is not equally divided into the left and right portions. When such vignetting occurs, shading correction is performed, as described above, on each focus detection signal based on vignetting information from which the vignetting state can be estimated, and more accurate focus detection operation is performed.

FIGS. 10C, 10D, 10E, and 10F are diagrams schematically illustrating a manner of pupil division on the exit pupil plane when the image blur correction lens 109 of the first image blur correction unit 104 is driven in the X direction. As described above, in the present embodiment, the first focus detection pixel 201 and the second focus detection pixel 202 of the image sensor 102 are arranged side by side in the X-axis direction. Therefore, when the image blur correction lens 109 of the first image blur correction unit 104 is driven in the X direction, the degree of influence on the pupil division for focus detection increases.

Figure 10F:
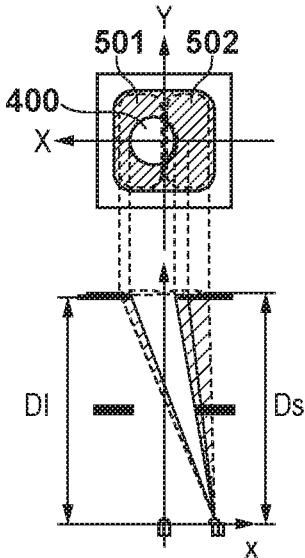

In the present embodiment, the first image blur correction unit 104 performs image blur correction by shifting, in the X-Y plane, one concave lens (image blur correction lens 109) arranged on the image plane side relative to the diaphragm. That is, when the image blur correction lens 109 is driven in the +X direction, the image sensor 102 observes the exit pupil 400 that is shifted in the −X direction on the pupil surface. Here, FIGS. 10C and 10D show a case where the image blur correction lens 109 is driven in the +X direction, and FIGS. 10E and 10F show a case where the image blur correction lens 109 is driven in the −X direction.

The manner of pupil division at the central image height when the image blur correction lens 109 of the first image blur correction unit 104 is driven in the +X direction will be described using FIGS. 10C and 10D. As described above, when the image blur correction lens 109 of the first image blur correction unit 104 is displaced in the +X direction, the exit pupil 400 moves in the −X direction. Strictly speaking, the shape is an ellipse in accordance with the cosine fourth law, but is expressed as a circle in order to simplify the description, here. In FIG. 10C, although the exit pupil 400 moves in the −X direction, vignetting caused by the final group holding frame 110 of the imaging optical system 101 denoted by the thick lines does not occur. However, since the diaphragm opening has shifted in the −X direction, the pupil is not equally divided in the left and right portions, and shading due to vignetting occurs even at the central image height. In FIG. 10D as well, similarly to FIG. 10C, the exit pupil 400 shifts in the −X direction, and vignetting caused by the final group holding frame 110 of the imaging optical system 101 occurs. In this case, different from FIG. 10C, although the amount of vignetting increases, the pupil is more equally divided into left and right portions than in FIG. 10C.

The manner of pupil division at the central image height and at the peripheral image height (+X direction) when the image blur correction lens 109 of the first image blur correction unit 104 is driven in the −X direction will be described using FIGS. 10E and 10F. When the image blur correction lens 109 of the first image blur correction unit 104 is displaced in the −X direction, the exit pupil 400 moves in the +X direction, opposite to that in FIGS. 10C and 10D. The exit pupil 400 is shown as a circle, in order to simply the description.

In FIG. 10E, although the exit pupil 400 moves in the +X direction, vignetting caused by the final group holding frame 110 of the imaging optical system 101 denoted by the thick lines does not occur. However, since the exit pupil 400 has moved in the +X direction, the pupil is not equally divided into left and right portions, and shading due to vignetting occurs even at the central image height. In FIG. 10F as well, similarly to FIG. 10D, vignetting caused by the final group holding frame 110 of the imaging optical system 101 occurs, and the exit pupil 400 moves in the +X direction. In this case, different from FIG. 10B, although the amount of vignetting decreases, the pupil is more unequally divided, and the ratio of the component of the focus detection signal on the −X side significantly decreases. If the shading correction and the defocus operation using the conversion coefficient K similarly to the conditions in FIGS. 10A and 10B are performed, under the conditions as shown in FIGS. 10C to 10F, focus cannot be accurately detected and the in-focus state cannot be reached.

For example, looking at FIGS. 10D and 10F illustrating a manner at the peripheral image height (+X direction), the amount of vignetting caused by the holding frame 110 is smaller in FIG. 10F. On the other hand, in the state of FIG. 10D, although the pupil is almost equally divided due to vignetting, the amount of transmitted light is small, and the S/N ratio of the signal used for focus detection decreases. That is, it can be understood that, when the focus detection frame is set at the image height in the +X direction in this way, the influence of vignetting caused by the holding frame 110 is less if the image blur correction lens 109 is displaced in the −X direction, as shown in FIG. 10D. The set image height of the focus detection frame and the position of the image blur correction lens 109 at which vignetting caused by the holding frame 110 starts to occur are specified from the tables of the shading correction coefficient SHD and the conversion coefficient K described above, and the degree of influence of vignetting on the focus detection becomes apparent. As can be understood from the above, the degree of influence of vignetting on the focus detection is not necessarily determined only by the image height of the focus detection area. Even at a high image height, a focus detection area is present at which the influence of vignetting is small. As a result of appropriately determining the influence of vignetting, the reliability determination unit 111 can more appropriately determine the reliability of the focus detection result.

Sensor Shift and Pupil Division

Figure 11A:
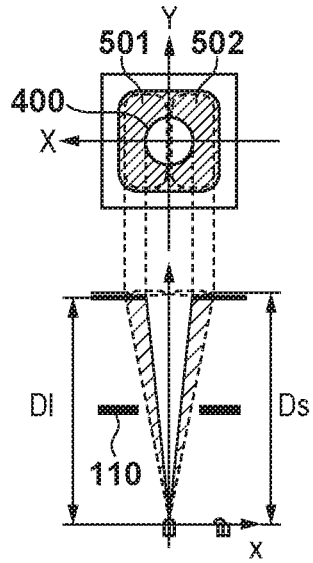
FIGS. 11A to 11F are diagrams schematically illustrating a relationship between driving of a second image blur correction unit and the focus detection.
Figure 11B:
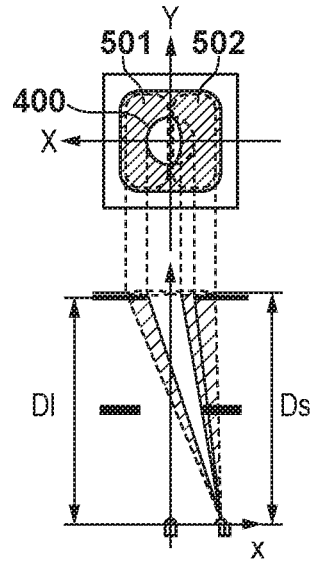
Figure 11C:
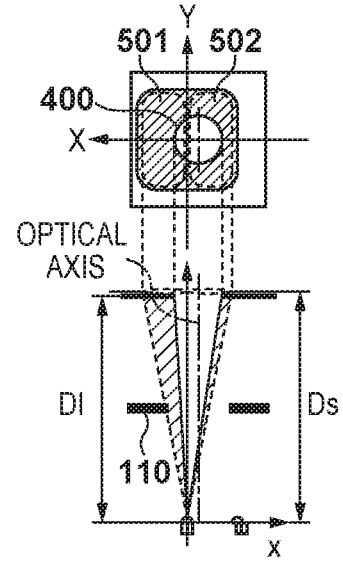
Figure 11D:
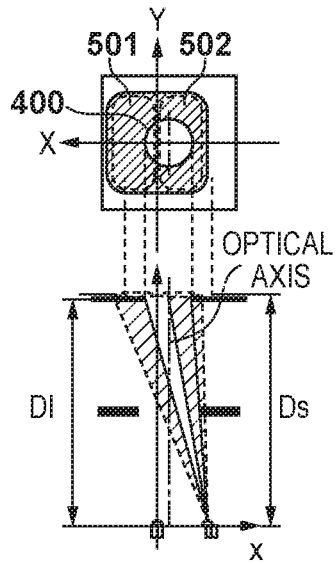
Figure 11E:
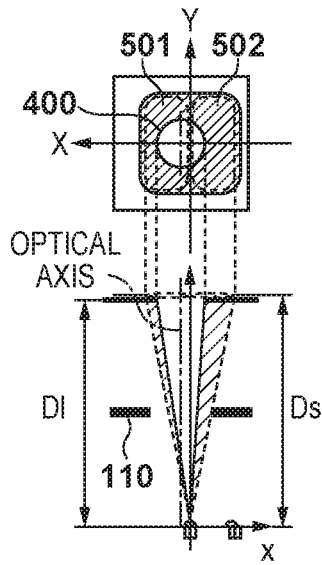
Figure 11F:
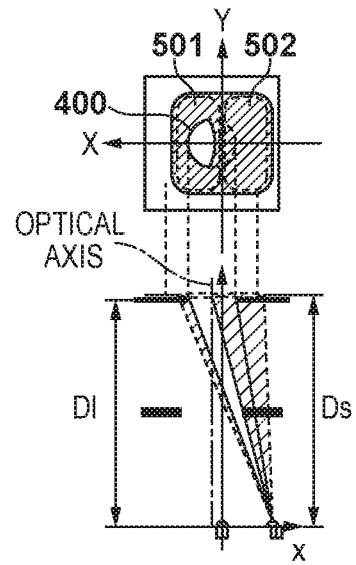

FIGS. 11A, 11C, and 11E are diagrams schematically illustrating the manner of pupil division on the exit pupil plane observed by a pixel group at the focus detection area at the central image height. Also, FIGS. 11B, 11D, and 11F are diagrams of that at the peripheral image height (+X direction). In FIGS. 11A to 11F, the exit pupil distance Dl of the imaging optical system 101 and the set pupil distance Ds of the image sensor 102 are depicted as almost the same.

The manner of pupil division at the central image height when the second image blur correction unit 105 is positioned at the center of the driving range will be described using FIG. 11A. The circular shape shown at the center of the pupil surface in the upper part of FIG. 11A illustrates the exit pupil 400 formed by the opening of the diaphragm of the imaging optical system 101. It can be understood that, at the central image height, the light beams at the exit pupil plane, of the imaging optical system 101, that is located at a distance almost the same as the set pupil distance of the image sensor 102 are almost equally divided into left and right portions. The thick lines arranged between the exit pupil 400 and the surface of the image sensor 102 schematically illustrate the final group holding frame 110 of the imaging optical system 101, and vignetting caused by this holding frame 110 does not occur at the central image height.

On the other hand, at the peripheral image height in FIG. 11B as well, the set pupil distance of the image sensor 102 is almost the same as the exit pupil distance of the imaging optical system 101, and the light beams at the exit pupil plane of the imaging optical system 101 can be almost equally divided into left and right portions, if the final group holding frame 110 is not present. However, in actuality, vignetting occurs on one side of the light beams due to the final group holding frame 110, and the pupil is not equally divided into left and right portions. When such vignetting occurs, shading correction is performed, as described above, on each focus detection signal based on vignetting information from which the vignetting state can be estimated, and a more accurate focus detection operation is performed.

FIGS. 11C, 11D, 11E, and 11F are diagrams schematically illustrating a manner of pupil division on the exit pupil plane when the second image blur correction unit 105 is driven in the X direction. The second image blur correction unit 105 in the present embodiment can drive the image sensor 102 in the X-Y plane. As described above, in the present embodiment, the first focus detection pixel 201 and the second focus detection pixel 202 of the image sensor 102 are arranged side by side in the X-axis direction. Therefore, when the image sensor 102 of the second image blur correction unit 105 is driven in the X direction, the degree of influence on the pupil division for focus detection is large. When the image sensor 102 is driven in the +X direction, the image sensor 102 observes the exit pupil 4000 that is shifted in the +X direction on the pupil surface.

Here, FIGS. 11C and 11D show a case where the image sensor 102 is driven in the −X direction, and FIGS. 11E and 11F show a case where the image sensor 102 is driven in the +X direction. The manner of the pupil division at the central image height when the second image blur correction unit 105 is displaced in the −X direction will be described using FIGS. 11C and 11D.

As described above, when the image sensor 102 is displaced in the −X direction, the exit pupil 400 also moves in the −X direction on the pupil surface. This phenomenon occurs because, as a result of the image sensor 102 being displaced in the −X direction, an axis that passes through the center of the image sensor 102 and is perpendicular to the imaging plane (corresponding to an arrow extending from the central pixel in the up and down direction) shifts from the optical axis of the imaging optical system 101. Therefore, on the exit pupil plane, the entirety of the first partial pupil region 501 and the second partial pupil region 502 are depicted as having been moved (toward left in the diagram) in the exit pupil plane, as shown in upper parts of FIGS. 11C and 11D. Strictly speaking, the shape of the exit pupil 400 is an ellipse in accordance with the cosine fourth law, but is expressed as a circle in order to simplify the description, here. In FIG. 11C, although the exit pupil 400 is moved in the −X direction, vignetting caused by the final group holding frame 110 of the imaging optical system 101 denoted by the thick lines does not occur. However, since the exit pupil 400 has shifted in the −X direction, the pupil is not equally divided into left and right portions, and shading due to vignetting occurs even at the central image height. In FIG. 11D as well, similarly to FIG. 11C, the exit pupil 400 shifts in the −X direction, and vignetting caused by the final group holding frame 110 of the imaging optical system 101 occurs. In this case, the optical axis of the imaging optical system 101 relatively approaches the peripheral image height position of the image sensor 102 that is focused on in FIG. 11D, and as a result, the amount of vignetting decreases from that in FIG. 11B, and the pupil division is similar to that in FIG. 11C.

The manner of pupil division at the central image height and at the peripheral image height (+X direction) when the second image blur correction unit 105 is displaced in the −X direction will be described using FIGS. 11E and 11F. When the image sensor 102 is displaced in the +X direction, the exit pupil 400 moves on the pupil surface in the +X direction, opposite to that in FIGS. 11C and 11D. This phenomenon occurs because, as a result of the image sensor 102 being displaced in the +X direction, an axis that passes through the center of the image sensor 102 and is perpendicular to the imaging plane (corresponding to an arrow extending from the central pixel in the up and down direction) shifts from the optical axis of the imaging optical system 101. Therefore, on the exit pupil plane, the entirety of the first partial pupil region 501 and the second partial pupil region 502 are depicted as having been moved (toward right in the diagram) in the exit pupil plane, as shown in upper parts of FIGS. 11E and 11F. Here, the exit pupil 400 is illustrated as a circle in order to simplify the description. In FIG. 11E, although the exit pupil 400 moves in the +X direction, vignetting caused by the final group holding frame 110 of the imaging optical system 101 denoted by the thick lines does not occur. However, since the exit pupil 400 has shifted in the +X direction, the pupil is not equally divided into left and right portions, and shading due to vignetting occurs even at the central image height. In FIG. 11F, the optical axis of the imaging optical system 101 relatively moves away from the peripheral image height position of the image sensor 102 that is focused on in FIG. 11F. and as a result, a large amount of vignetting caused by the final group holding frame 110 of the imaging optical system 101 occurs, and the exit pupil 400 moves in the +X direction. In this case, different from FIG. 11B, although the amount of vignetting decreases, non-uniformity in the pupil division increases, and the ratio of the component of the focus detection signal on the –X side is approximately zero. If the shading correction and the defocus operation using the conversion coefficient K similar to the conditions of FIGS. 11A and 11B are performed, under the conditions of FIGS. 11C to 11F, accurate focus detection is impossible, and the in-focus state cannot be reached.

For example, looking at FIGS. 11B and 11D illustrating a manner at the peripheral image height (+X direction), the amount of vignetting caused by the holding frame 110 is smaller in FIG. 11D. On the other hand, in a state of FIG. 11B, the amount of vignetting caused by the holding frame 110 increases from that in FIG. 11D. That is, it can be understood that, when the focus detection frame is set at the image height in the +X direction in this way, the influence of vignetting caused by the holding frame 110 is less if the image sensor 102 is displaced in the –X direction, as shown in FIG. 11D. The set image height of the focus detection frame and the position of the image blur correction lens 109 at which vignetting caused by the holding frame 110 starts to occur are specified from the tables of the shading correction coefficient SHD and the conversion coefficient K described above, and the degree of influence of vignetting on the focus detection becomes apparent.

As can be understood from the above, the degree of influence of vignetting on the focus detection is not necessarily determined only by the image height of the focus detection area. Even at a high image height, a focus detection area is present at which the influence of vignetting is small. As a result of appropriately determining the influence of vignetting, the reliability determination unit 111 can more appropriately determine the reliability of the focus detection result.

A system in which the exit pupil distance Dl of the imaging optical system 101 and the set pupil distance Ds of the image sensor 102 are almost the same has been described as an example, both in FIGS. 10A to 10F and FIGS. 11A to 11F. Since the image capturing apparatus 1000 is an interchangeable lens digital camera, a combination in which Dl>Ds or Dl<Ds will actually occur. In this case, because the first image blur correction unit 104 and the second image blur correction unit 105 operate in the situation shown in FIGS. 8A to 8C, the vignetting situation is different from that shown in FIGS. 10A to 10F and FIGS. 11A to 11F. Vignetting information that comprehensively includes the information regarding the exit pupil distance Dl of the imaging optical system 101 is stored in the storage unit 106, and information for enabling the reliability determination unit 111 to perform reliability determination is appropriately retained.

Figure 12:
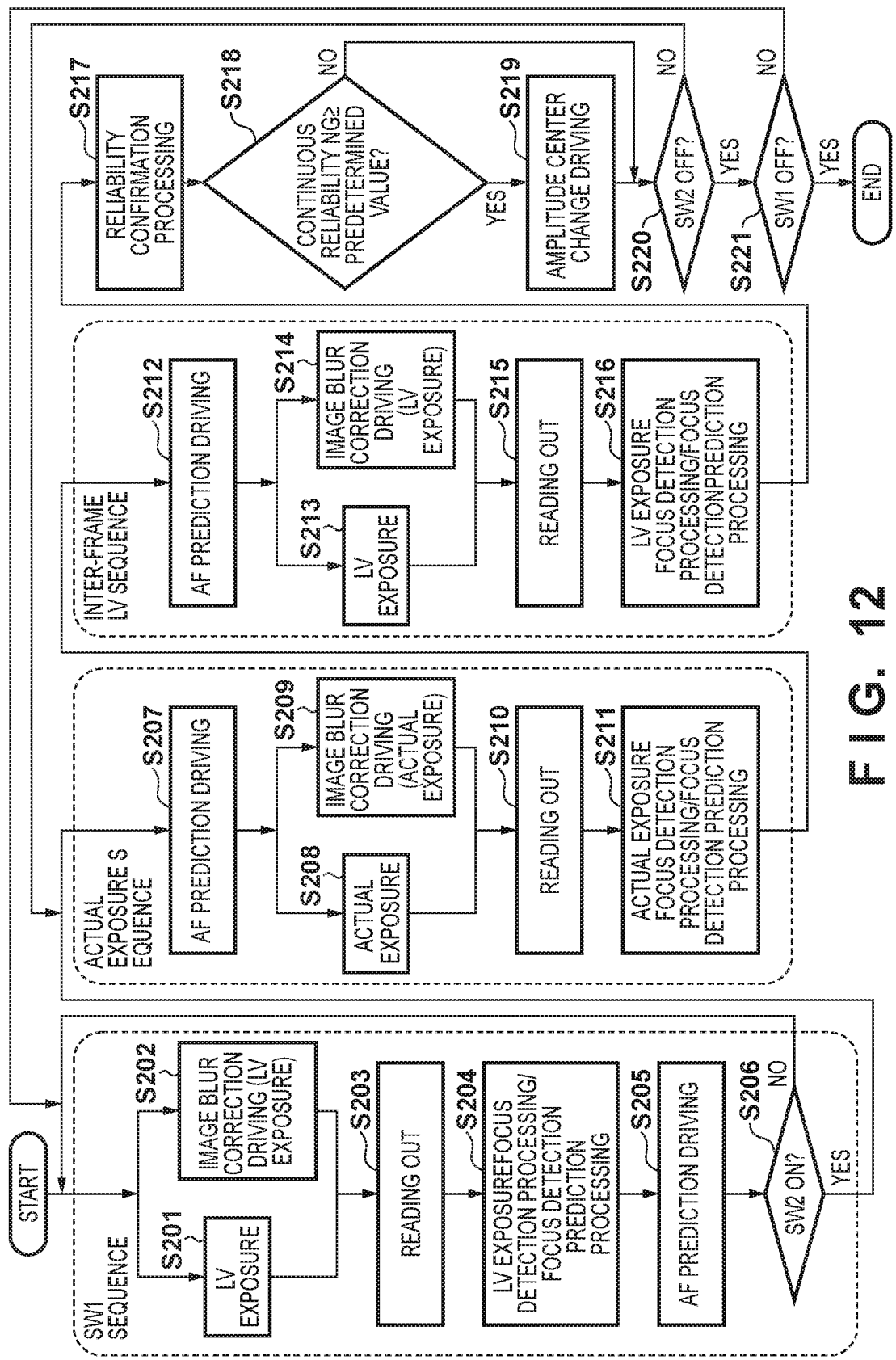
FIG. 12 is a flowchart illustrating operations of a reliability determination unit and a focus detection prediction unit.

Flow of LV+Reliability Determination in Actual Exposure+Focus Detection Prediction The processing of reliability determination and focus detection prediction that is performed by the image capturing apparatus 1000 in the non-actual exposure period before and after shooting an actual image is performed and in the actual exposure period will be described using FIG. 12. FIG. 12 is a diagram illustrating a flow when the image capturing apparatus 1000 performs continuous shooting while performing the above-described live view, and the flow is started when a release button (unshown) is pressed half-way by the photographer (switch SW1 is turned on). When this flowchart is started, in step S201, the image sensor 102 performs exposure for a live view image (hereinafter, this exposure is referred to as "LV exposure").

During the LV exposure period in step S201, the first and second image blur correction units 104 and 105 perform image blur correction driving in step S202 at the same time. In the image blur correction driving during LV exposure, a sufficient stroke needs to be secured for the image blur correction for actual exposure that is started when a later-described switch SW2 is turned on, and therefore the control stroke is set to be smaller than that during actual exposure. This means that the movement of the pupil by the image blur correction during focus detection is small, and the influence of vignetting on the focus detection described above is relatively limited.

At the same time as when LV exposure is ended, a read operation in step S203 is executed by the image sensor 102. Next, in step S204, the focus detection unit 103 performs focus detection processing on the live view image obtained by the LV exposure. Here, the above-described reliability determination is also performed, and a reliability determination value is added to indicate whether or not the focus detection result is reliable. In step S204, furthermore, the focus detection unit 103 executes processing for writing a history entry of the focus detection result to the storage unit 106. If the reliability determination value of the focus detection result exceeds a predetermined value, writing of the focus detection result is performed, and if not, writing is not performed. Specifically, the focus detection result is not written, and instead, a value indicating that the reliability determination value is low is written. The focus detection prediction unit 112 predicts the focus adjustment position at which the main object is expected to come into focus at the next frame, using this focus detection prediction history information as the learning target. This can be obtained by extrapolating, using an approximation function, the history points of the focus detection results that have been written, with consideration given to the reliability determination values so far.

Although a detailed description of the extrapolation processing will be omitted, a prediction method of focus detection that has been conventionally used needs only be used. Note that, if the reliability determination value is low, the focus detection result is not written into the storage unit 106 in step S204 in order to remove the result from the focus detection prediction history serving as the learning target. However, if the difference between the focus detection prediction processing result in step S204 and the focus detection result (focus detection processing in step S204) in the next frame is not equal to or greater than a predetermined value (less than the predetermined value), the result may be written into the storage unit 106 as the focus detection prediction history serving as the learning target.

In step S205, the control unit 130 moves the focus lens 108 to the focus adjustment position predicted in step S204. As a result of this movement, when exposure is performed in the next frame, a state of the focus lens 108 can be achieved in which an in-focus image can be obtained. Hereinafter, this is referred to as AF prediction drive.

Next, in step S206, it is determined whether or not the release button has been pressed fully (switch SW2 is turned on), that is, whether or not the photographer has instructed to start shooting an actual image including continuous shooting. The sequence from step S201 to step S206 described so far is referred to as SW1 sequence before starting continuous shooting. This sequence continues until the switch SW2 is turned on. During this SW1 sequence, exposure for actual shooting is not performed, exposure and reading out of a live view image for displaying in the backside liquid crystal are repeatedly performed. Then, focus detection processing and AF prediction drive are performed every frame based on the read-out image.

In the present embodiment, the reliability determination unit 111 performs reliability determination in step S204, but the present invention is not limited thereto, and the reliability determination may not be performed in the case of image blur correction driving for LV exposure. Also, even in a case where reliability determination is performed, the reliability determination value, which is the result of the determination, may be adopted after reducing the weight thereof when the result is used. Also, the configuration may be such that, when reliability determination is performed, only reliability determination using a conventional method is performed, and the drive history information regarding the two image blur correction units, information regarding the focus detection area, and information regarding the vignetting may not be used.

In step S206, if it is determined that the switch SW2 has been turned on, the processing advances to step S207, and AF prediction drive is performed. As a result of the AF prediction drive, the focus lens 108 is moved to the position at which the object is expected to come into focus in the next exposure.

In step S208, exposure for actual shooting (actual exposure) is performed by the image sensor 102. During this exposure, in step S209, the first and second image blur correction units 104 and 105 perform image blur correction driving for actual exposure. As described above, in the image blur correction for actual exposure, the driving is performed at a maximum stroke in order to not record image blur, and as a result, the driving is performed at a stroke that is greater than the control stroke in the LV exposure.

At the same time as completion of the actual exposure in step S208, in step S210, a read operation of pixel signals from the image sensor 102 is performed. In step S211, similarly to step S204, the focus detection processing and the focus detection prediction processing are performed. The focus detection processing in the actual exposure is performed similarly to that in the LV exposure except that larger image data is targeted. The horizontal addition processing and the vertical thinning processing, which have been described in step S110 in FIG. 7, are performed on the read-out image data such that the size is changed to the same size as the live view image, and the focus detection processing is performed with the same accuracy as that in focus detection performed on the live view image. The focus detection prediction processing in the actual exposure is the same as that in the LV exposure. The sequence from step S207 to step S211 that is related to the actual exposure is referred to as an actual exposure sequence.

The operations from step S212 to step S216 are referred to as an inter-frame LV sequence in the present embodiment. The inter-frame LV sequence is a sequence in which LV exposure is performed, and image blur correction driving for the LV exposure is performed, similarly to the SW1 sequence. The inter-frame LV sequence is the same as the actual exposure sequence except that the acquired image is a live view image, and the image blur correction driving is driving for the LV exposure, and therefore a description thereof will be omitted. Note that, in the present embodiment, one actual exposure sequence and one inter-frame LV sequence are performed as a set after the switch SW2 is turned on, but there is no limitation thereto, and the number of inter-frame LV sequences may be increased according to a continuous shooting speed or the like. Also, the live view image acquired in the inter-frame LV sequence may be displayed in the backside liquid crystal display, or merely used in the internal processing of the image capturing apparatus 1000.

Step S217 is processing that is performed after a plurality of actual exposure sequences and inter-frame LV sequences have been executed after the switch SW2 is turned on, and a plurality of reliability determination values have been given to each of the live view images and the actual exposure images. In step S217, count processing is executed if a result in which the reliability determination value obtained in the actual exposure sequence is low, and the reliability determination value obtained in the inter-frame LV sequence is high is obtained successively (this state is referred to as a continuous reliability NG state). Specifically, the number of continuous reliability NG states that continue is counted and stored in the storage unit 106. This is performed by the reliability determination unit 111.

Next, in step S218, it is determined whether or not the number of continuous reliability NG states that have been counted in step S217 is three or more. As described above, in the inter-frame LV sequence, image blur correction driving for LV exposure in which the stroke amount is small is performed ((step S214) similarly to the SW1 sequence, and it is unlikely that the focus detection will be adversely affected by vignetting. On the other hand, in the actual exposure sequence, since the image blur correction driving in which the stroke amount is large is performed, the focus detection is more likely to be adversely affected by vignetting than in the inter-frame LV sequence. In the counting of the number of continuous reliability NG states in step S217 and in the determination in step S218, it is determined whether or not the current position of the image blur correction unit is in a vignetting state in which the focus detection is adversely affected. Note that, here, the determination threshold value is three, but there is no limitation thereto, and the value may be increased on the condition of low luminance, or may be reduced if the movement of the object in the screen is small, for example. Also, the vignetting state has already been estimated when the reliability determination is performed, and therefore the processing may be advanced to step S219 without waiting for the determination in this step.

If it is determined that, in step S218, the number of continuous reliability NG states is three or more, in step S219, amplitude center change driving is performed. The details thereof will be described later. Also, if it is determined that, in step S218, the number of continuous reliability NG states is less than three, step S219 is skipped.

In step S220, it is determined whether or not the state in which the switch SW2 is on is cancelled. If it is determined that the state is not cancelled, it is determined that the photographer intends to perform continuous shooting, and the processing returns to the actual exposure sequence. If it is determined that the state is cancelled, the processing advances to step S221. In step S221, it is determined whether or not the state in which switch SW1 is on is cancelled, that is, the pressing down of the release button is completely cancelled. If it is determined that the state is not cancelled, it is possible that starting of the next continuous shooting sequence will be instructed, and the processing returns to the SW1 sequence. If it is determined that the state is cancelled, it is determined that the photographer does not intend to continue shooting, and this flow is ended.

The setting of the drive amplitude centers of the first image blur correction unit 104 and the second image blur correction unit 105 performed by the image blur correction control unit 107 will be described using FIGS. 13A and 13B. This corresponds to the amplitude center change driving in step S219 in the flowchart in FIG. 12.

Figure 13A:
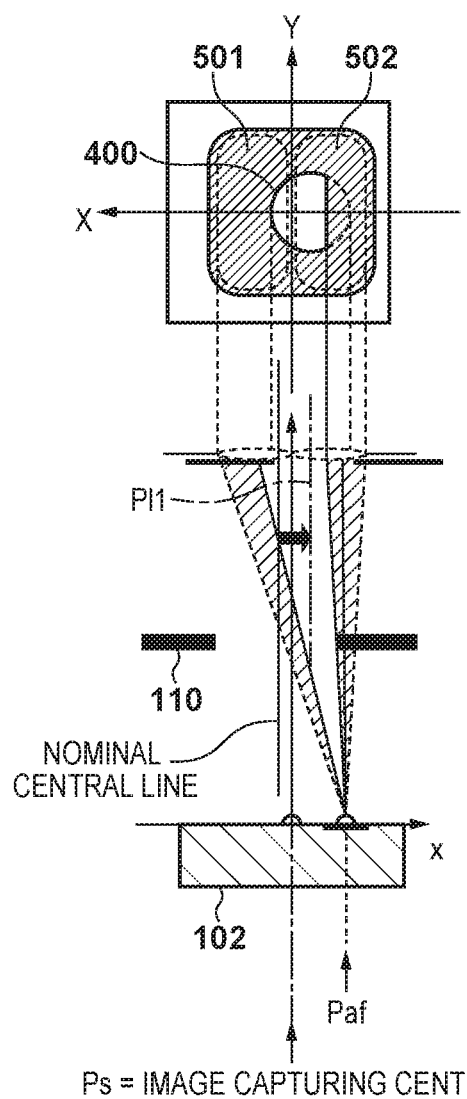
FIGS. 13A and 13B are schematic diagrams illustrating drive amplitude center change driving performed by the two image blur correction units.
Figure 13B:
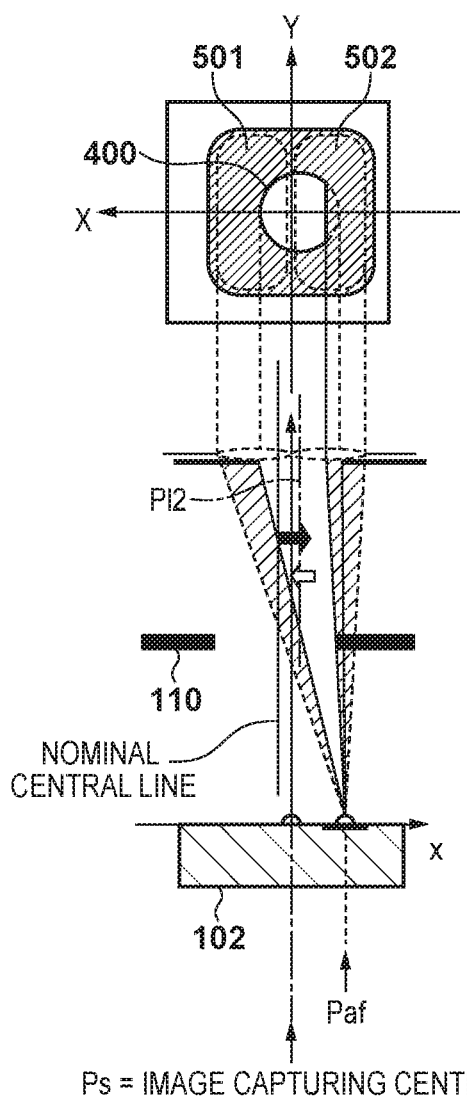

FIGS. 13A and 13B are schematic diagrams illustrating the setting of the drive amplitude center performed by the image blur correction control unit 107. Paf in the diagrams indicates the position of the focus detection area that has been set. Also, Pl indicates a central position of the image blur correction lens 109 of the first image blur correction unit 104, and Ps indicates a central position of the image sensor 102 of the second image blur correction unit 105.

FIG. 13A shows a state in which the focus detection area that has been set in the last actual exposure sequence is located at a position Paf, the image blur correction lens 109 of the first image blur correction unit 104 is located at an amplitude center position Pl1, and the image sensor 102 of the second image blur correction unit 105 is located at an amplitude center position Ps. In FIG. 13A, the image blur correction lens 109 and the image sensor 102 are shifted and respectively located at positions shifted from a nominal central line, which is the reference, by Pl1 and Ps. Here, specifically, the shift from the nominal central line to the position Pl of the image blur correction lens 109 is denoted by a black arrow. It is apparent that, from the positional relationship between positions Paf, Pl1, and Ps, vignetting occurs due to the holding frame 110, the cut out region of the pupil area 400 has lost balance between the left and right portions, and there is a difference in the shading correction coefficients that are to be applied. It is determined that the reliability of the focus detection result in this vignetting state is low, and this determination is repeated the predetermined number of times, and therefore, in step S218 in FIG. 12, it is determined that amplitude center change driving is necessary.

FIG. 13B shows a state in which, after the amplitude center change driving has been performed in step S219 in FIG. 12, the focus detection area is located at a position Paf that has been set in the actual exposure sequence, and the image blur correction lens 109 and the image sensor 102 are located at the respective amplitude center positions P12 and Ps. Specifically, the position of the image blur correction lens 109, which was at Pl1 in FIG. 13A, is changed to P12. This change is denoted by the white arrow facing left. If the focus detection is performed in this positional relationship, the balance between the left and right portions of the cut out region of the pupil area 400 improves relative to that in the state shown in FIG. 13A (unbalance is reduced), and it is determined that the reliability is high in the reliability determination performed by the reliability determination unit 111.

The amplitude center change driving in step S219 in FIG. 12 is driving in which the relationship between the central positions of the two image blur correction units in FIG. 13A in which the influence of vignetting is large is gradually changed to the positional relationship in FIG. 13B in which the influence of vignetting is small. The case of FIG. 13B corresponds to a case where the center of the drive amplitude of the image blur correction lens 109 is offset by an amount corresponding to the white arrow. As a result of gradually changing the position of the image blur correction lens 109, the angle of view does not change rapidly, and the framing performed by the photographer is kept from being adversely affected. Note that, here, only the position of the image blur correction lens 109 is changed, but the present invention is not limited to this, and the two image blur correction units may be driven at an appropriate rate according to the balance of the strokes of the two image blur correction units and the focal length or the like of the imaging optical system 101.

Note that the drive history information regarding the two image blur correction units, the information regarding the focus detection area, and the information regarding vignetting, which are pieces of information used for various operations, may be stored so as to be associated with the target image data. As a result of associating various pieces of information with the image, the information can be used in later-stage image processing.

As described above, according to the embodiment described above, it is possible to appropriately determine the reliability of the focus adjustment state according to the vignetting state that occurs caused by driving the image blur correction unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221995, filed Nov. 17, 2017 which is hereby incorporated by reference herein in its entirety.

What is claimed is:

1. An image capturing apparatus comprising:
   a focus detection unit configured to perform focus detection based on a phase difference between a plurality of image signals obtained by photo-electrically converting light beams that respectively pass through different partial pupil regions of an imaging optical system;
   an image blur correction unit configured to correct image blur of an object image by driving an optical member for image blur correction; and
   a determination unit configured to determine reliability of a focus detection result detected by the focus detection unit based on information regarding a focus detection area on which the focus detection unit performs focus detection, and information regarding vignetting that occurs in light beams that pass through the imaging optical system as a result of the image blur correction unit correcting the image blur.

2. The image capturing apparatus according to claim 1, wherein the determination unit is further configured to determine reliability of a focus detection result detected by the focus detection unit based on information regarding a drive history of the image blur correction unit in a period during which the focus detection unit performs focus detection, the information regarding the drive history being information regarding a center of gravity position of a locus of the position to which an optical member for the image blur correction has been driven.

3. The image capturing apparatus according to claim 1, wherein the information regarding the vignetting includes information regarding a shape of light beams on an exit pupil plane of the imaging optical system according to the state of vignetting that occurs in the light beams that pass through the imaging optical system.

4. The image capturing apparatus according to claim 1, wherein the information regarding the vignetting includes information regarding an intensity ratio of the plurality of image signals, or information regarding a conversion coefficient that is used when the phase difference between the plurality of image signals is converted to a defocus amount.

5. The image capturing apparatus according to claim 1, further comprising a focus detection prediction unit configured to predict a focus detection result of the next shooting operation using a focus detection result detected by the focus detection unit as a learning target,
   wherein the focus detection prediction unit is configured to remove a focus detection result whose reliability is determined to be low by the determination unit from the learning target.

6. The image capturing apparatus according to claim 5, wherein the focus detection prediction unit is configured to not remove a focus detection result whose reliability is determined to be low from the learning target, if the difference between the result of focus detection prediction predicted based on the focus detection result which has become the learning target and the focus detection result whose reliability has been determined to be low by the determination unit is less than a predetermined value.

7. The image capturing apparatus according to claim 1, wherein the image blur correction unit reduces the drive amount of an optical member for the image blur correction, in a non-actual exposure period in which live view images before and after an actual image is shot are acquired, relative to the drive amount of an optical member for the image blur correction in an actual exposure period in which the actual image is shot.

8. The image capturing apparatus according to claim 7, wherein the determination unit is configured to not determine the reliability of the focus detection result in the non-actual exposure periods.

9. The image capturing apparatus according to claim 7, wherein the determination unit is configured to use the reliability, whose weight is reduced, of the focus detection result that is obtained in the non-actual exposure period, to confirm reliability.

10. The image capturing apparatus according to claim 7, wherein the image blur correction unit is configured to, if the number of history entries in which the determination unit has determined that the reliability in the actual exposure period is low and the reliability in the non-actual exposure period is high exceeds a predetermined number, moves the drive amplitude center of an optical member for the image blur correction to a position at which influence of the vignetting on focus detection is reduced.

11. The image capturing apparatus according to claim 1, wherein the image blur correction unit includes two types of image blur correction units, namely a first image blur correction unit and a second image blur correction unit whose methods are different.

12. The image capturing apparatus according to claim 11, wherein the first image blur correction unit is configured to correct image blur by moving an image blur correction lens that serves as an optical member for the image blur correction, and the second image blur correction unit is configured to correct image blur by moving an image sensor, for capturing an object image, that serves as an optical member for the image blur correction.

13. The image capturing apparatus according to claim 1, wherein the focus detection unit is configured to perform focus detection using signals obtained by a plurality of photoelectric conversion portions that are arranged in each pixel of an image sensor that captures an object image.

14. A method of controlling an image capturing apparatus including a focus detection unit configured to perform focus detection based on a phase difference between a plurality of image signals obtained by photo-electrically converting light beams that have respectively pass through different partial pupil regions of an imaging optical system, and an image blur correction unit configured to correct image blur of an object image by driving an optical member for image blur correction, the method comprising:
   determining reliability of a focus detection result detected by the focus detection unit based on information regarding drive history of the image blur correction unit, information regarding a focus detection area on which the focus detection unit performs focus detection, and information regarding vignetting that occurs in light beams that pass through the imaging optical system, in a period during which the focus detection unit performs focus detection.

15. An image capturing apparatus comprising:
at least one processor or circuit configured to perform the operations of the following units:
a focus detection unit configured to perform focus detection based on a phase difference between a plurality of image signals obtained by photo-electrically converting light beams that have respectively passed through different partial pupil regions of an imaging optical system;
an image blur correction unit configured to correct image blur of an object image by driving an optical member for image blur correction; and
a determination unit configured to determine reliability of a focus detection result detected by the focus detection unit based on information of a focus detection area on which the focus detection unit performs focus detection, and information regarding vignetting that occurs in light beams that pass through the imaging optical system as a result of the image blur correction unit correcting the image blur.

* * * * *